US007120205B2

(12) United States Patent
Salehi et al.

(10) Patent No.: US 7,120,205 B2
(45) Date of Patent: Oct. 10, 2006

(54) METHOD AND SYSTEM FOR MULTIPLE-SHIFT CODE ACQUISITION OF OPTICAL ORTHOGONAL CODES IN OPTICAL CDMA SYSTEMS

(76) Inventors: Jawad Ahmed Salehi, 6052 Charles Edward Ter., Columbia, MD (US) 21045; Abtin Keshavarzian, 9 Cornstock Cir., Apartment A, Stanford, CA (US) 94305

( * ) Notice: Subject to any disclaimer, the term of this patent is extended or adjusted under 35 U.S.C. 154(b) by 941 days.

(21) Appl. No.: 10/140,669

(22) Filed: May 8, 2002

(65) Prior Publication Data

US 2003/0137956 A1 Jul. 24, 2003

Related U.S. Application Data

(60) Provisional application No. 60/348,280, filed on Jan. 15, 2002.

(51) Int. Cl.
  H03K 9/00 (2006.01)
  H04L 27/06 (2006.01)
  H04L 27/14 (2006.01)
  H04L 27/22 (2006.01)
(52) U.S. Cl. .................................. 375/316; 398/154
(58) Field of Classification Search ................ 375/316, 375/130, 140, 147, 224, 354, 356; 398/154, 398/140; 370/229, 238, 235, 508, 507, 503, 370/498, 464
See application file for complete search history.

(56) References Cited

U.S. PATENT DOCUMENTS

| | | | | |
|---|---|---|---|---|
| 5,610,746 A * | 3/1997 | Ranalli | ................ | 398/102 |
| 5,793,759 A * | 8/1998 | Rakib et al. | ................ | 370/342 |
| 5,991,308 A * | 11/1999 | Fuhrmann et al. | ..... | 370/395.53 |
| 6,215,814 B1 * | 4/2001 | Ylitalo et al. | ................ | 375/148 |
| 6,292,282 B1 * | 9/2001 | Mossberg et al. | ............. | 398/99 |
| 6,307,868 B1 * | 10/2001 | Rakib et al. | ................ | 370/485 |
| 6,356,555 B1 * | 3/2002 | Rakib et al. | ................ | 370/441 |
| 6,366,571 B1 * | 4/2002 | Fiut et al. | ................ | 370/342 |
| 6,665,308 B1 * | 12/2003 | Rakib et al. | ................ | 370/441 |
| 6,735,192 B1 * | 5/2004 | Fried et al. | ................ | 370/352 |
| 6,757,249 B1 * | 6/2004 | Kejriwal et al. | ......... | 370/235.1 |
| 6,829,290 B1 * | 12/2004 | Schmidl et al. | ............. | 375/147 |
| 6,934,250 B1 * | 8/2005 | Kejriwal et al. | ............ | 370/229 |

OTHER PUBLICATIONS

G.C. Yang, "Performance Analysis in Synchronization and System on CDMA Optical Fiber Networks", IEICE Trans. Comm. vol. E77B, No. 10, pp. 1238-1248, 1994.
Mustapha et al, "Performance of a Serial-Search Synchronizer for Fiber-base Optical CDMA Systems in the Presence of Multi-user Interference", Proc. SPIE, vol. 3899, pp. 297-306.
Mustapha et al, "Dual-Threshold Sequencial Detection Synchronization for an Optical CDMA Network in the Presence of Multi-user Interference", Journal of Lightwave Technology, vol. 18, No. 12, pp. 1742-1748, Dec. 2000.

* cited by examiner

*Primary Examiner*—Chieh M. Fan
*Assistant Examiner*—Nader Bolourchi
(74) *Attorney, Agent, or Firm*—John T. Peoples

(57) ABSTRACT

A technique for determining an arbitrary delay in a source code word propagated over a channel that introduces the arbitrary delay in the source code word to produce a received code word. The technique is based upon a multiple-shift algorithm to determine the delay by a coarse synchronization process to locate synchronization as contained within a composite code pattern, and a fine synchronization process to pinpoint the delay by examining shifts in the source code word used to form the composite code pattern.

19 Claims, 18 Drawing Sheets

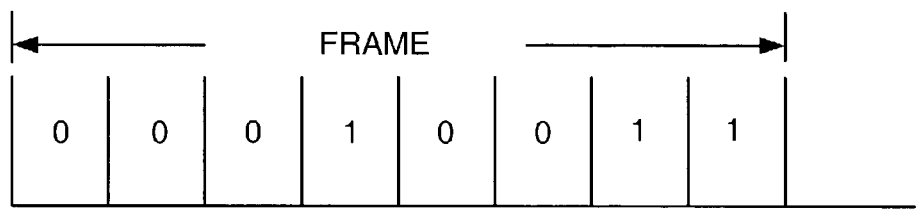
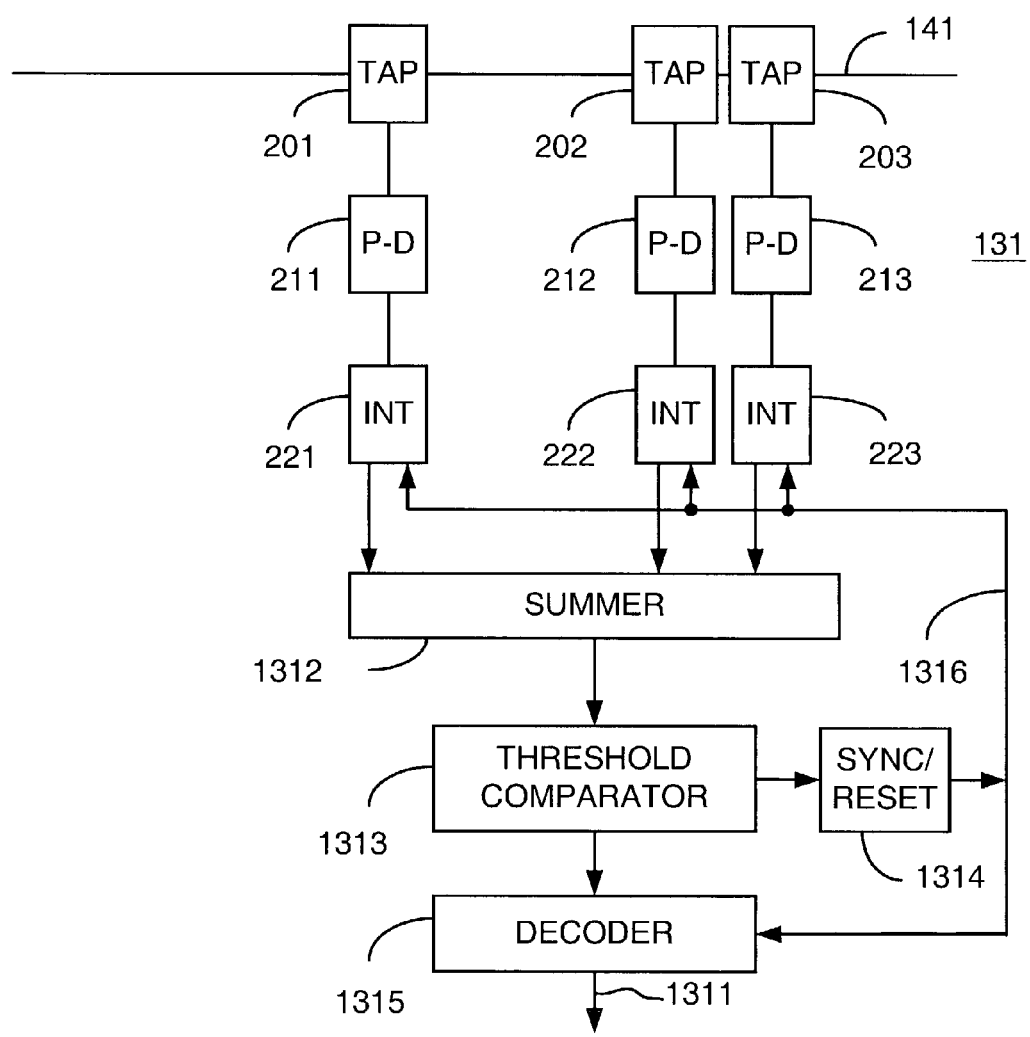
FIG. 5A

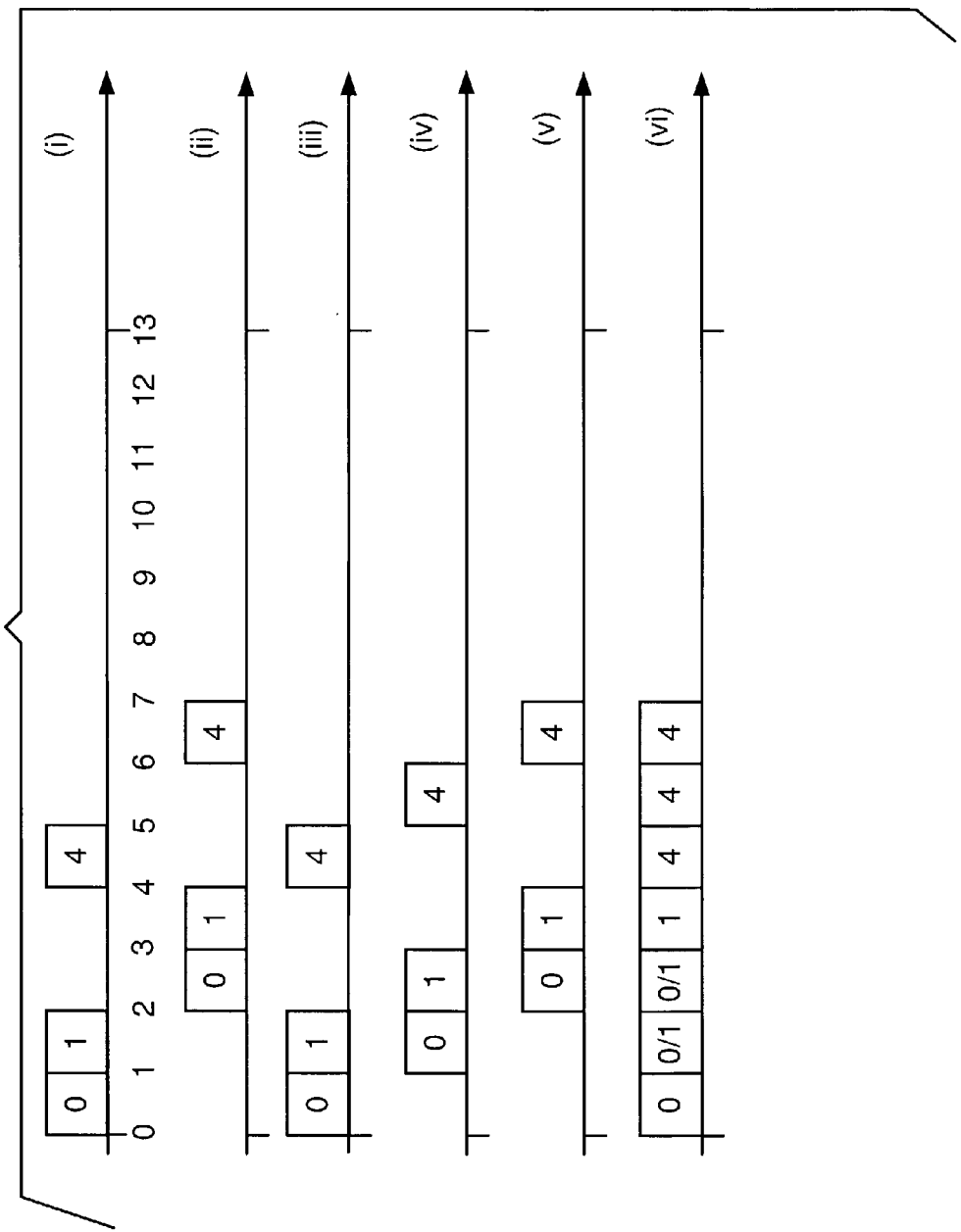

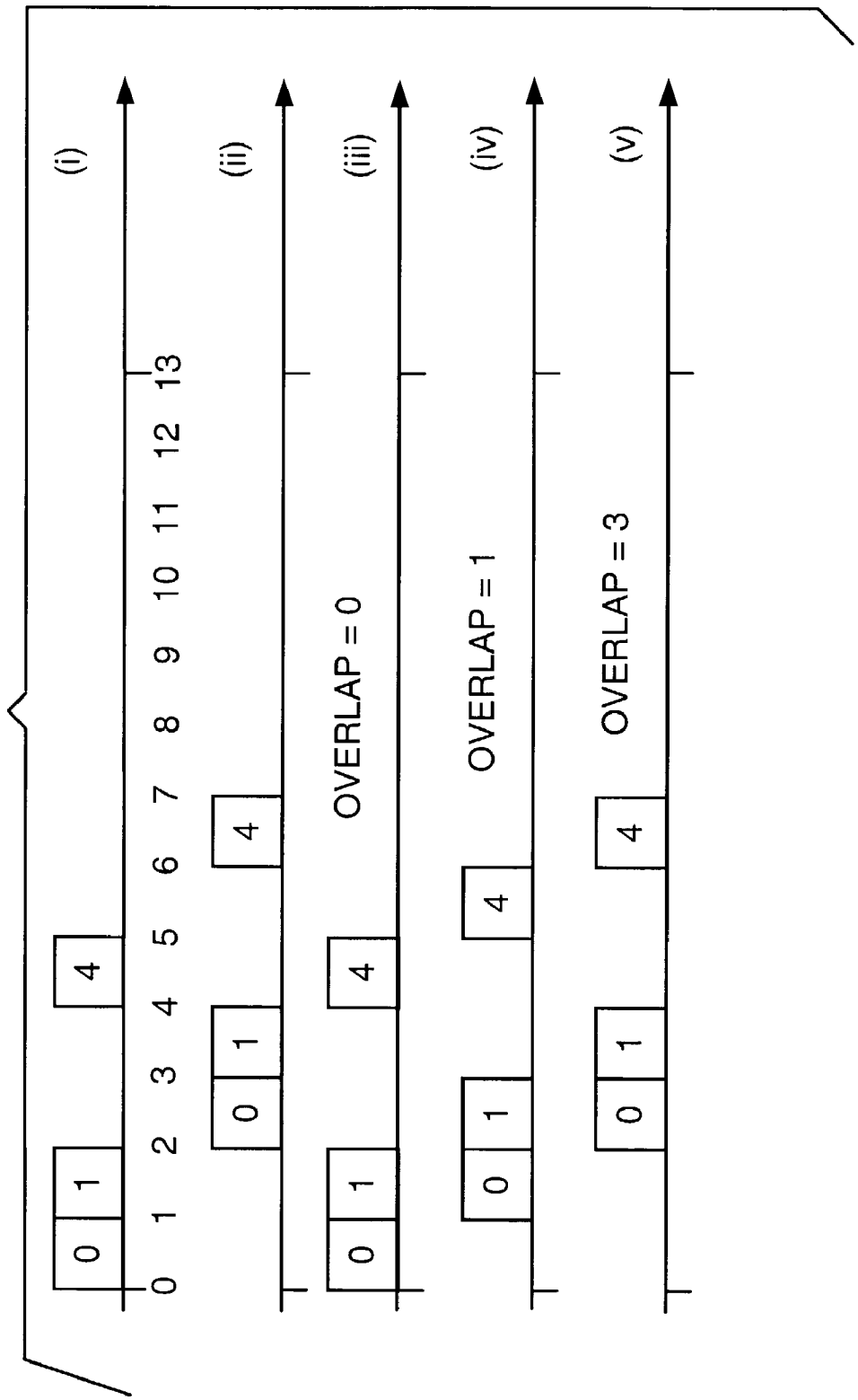

METHOD AND SYSTEM FOR MULTIPLE-SHIFT CODE ACQUISITION OF OPTICAL ORTHOGONAL CODES IN OPTICAL CDMA SYSTEMS

CROSS REFERENCE TO RELATED APPLICATION

This application is a non-provisional application of provisional application Ser. No. 60/348,280 filed Jan. 15, 2002.

BACKGROUND OF THE DISCLOSURE

1. Field of the Invention

This invention relates generally to an all-optical Code Division Multiple Access (CDMA) system and, more particularly, to a methodology and a concomitant system for the optical synchronization of the transmitter and receiver in the CDMA system.

2. Description of the Background Art

Optical synchronization will undoubtedly play a central role in helping to introduce all-optical CDMA networks for future bursty and packet-based communications systems. As the speed of all-optical packet communications increases dramatically, the success of optical synchronization will rest upon introducing a very efficient technique in order to obtain the synchronization with minimal required time.

The majority of published works on all-optical CDMA systems assumes perfect synchronization between each receiver and transmitter pair. However, the article entitled "Performance Analysis in Synchronization and System on CDMA Optical Fiber Networks, by G. C. Yang, as published in *IEICE Trans. Comm.*, vol. E77B, No. 10, pp. 1238–1248, in October, 1994 did consider a simple synchronization method for non-coherent optical CDMA and highlighted the importance of synchronization by showing the degradation in the performance of the system when the synchronization between receiver and transmitter is not ideal. Later, the article entitled "Performance of a Serial-Search Synchronizer for Fiber-base Optical CDMA Systems in the Presence of Multi-user Interference" by Mustapha et al., as published in *Proc. SPIE*. Vol. 3899, pp. 297–306, introduced, first, a serial-search synchronizer. Then, most recently, Mustapha et al. in an article entitled "Dual-Threshold Sequential Detection Code Synchronization", published in the *Journal of Lightwave Technology*, vol. 18, No. 12, pp. 1742–1748, December 2000, demonstrated a second-type of sequential method for synchronization of an optical orthogonal code (OOC)-CDMA system. Guided by the aforementioned work, the present inventors have considered the performance of simple serial-search algorithm for code acquisition in an optical CDMA system using OOCs and have noted that the mean time required for synchronization is in the order of half code length bits duration. Long code lengths may be used in a typical system that therefore requires a long period for synchronization.

It is clear that the art is devoid of a multiple-shift technique which not only is simple in its structure but it also greatly improves the performance of synchronization process.

SUMMARY OF THE INVENTION

These shortcomings and other limitations and deficiencies are obviated in accordance with the present invention by a method, and concomitant circuitry, to determine synchronization information by a technique which first effects coarse synchronization to localize the synchronization information followed by fine synchronization to pinpoint the synchronization information.

In accordance with one broad method aspect of the present invention, a method for determining an arbitrary delay in a source code word propagated over a channel that introduces the arbitrary delay in the source code word to produce a received code word, the code words encompassing a given time interval, includes: (a) partitioning the time interval into cells and grouping a plurality of cells into groups of cells; (b) examining each of the groups to locate a particular one of the groups containing the arbitrary delay with reference to the code words; and (c) estimating the arbitrary delay within the particular one of the groups with reference to the code words.

In accordance with yet another broad method aspect of the present invention, a method for determining an arbitrary delay in a source code word propagated over a channel that introduces the arbitrary delay in the source code word to produce a received code word, the code words encompassing a given time interval, includes: (a) partitioning the bit interval into a number of cells; (b) grouping the cells into a plurality of groups; (c) generating a composite code pattern by combining shifts in the source code word with reference to a shift parameter and a previously unused one of the groups; (d) computing an overlap value by evaluating the overlap of the received code word with the composite code pattern; (e) if the overlap value exceeds a given threshold, continuing with (f); otherwise returning to (c); (f) sequentially comparing the received code word for a selected one of the shifted versions of the source code word used to form the composite code pattern to produce a second overlap value; and (g) whenever the second overlap value exceeds a predetermined threshold, equating the shift in the compared shifted version of the source code word to the arbitrary delay; otherwise, either returning to (f) until all shifted versions are processed or to (c) until all groups are processed.

Broad system aspects of the present invention are commensurate with the aforementioned broad method aspects.

The technique of the present invention can be used with many different receiver structures like active or passive correlators and with or without hardlimiter(s).

BRIEF DESCRIPTION OF THE DRAWINGS

The teachings of the present invention can be readily understood by considering the following detailed description in conjunction with the accompanying drawings, in which:

FIG. 5A is a block diagram depicting a block diagram of an illustrative embodiment of a decoder in FIG. 1;

FIG. 7A is a pictorial representation of the technique for forming the composite code symbol pattern;

FIG. 7C is a pictorial representation of the fine synchronization processing;

To facilitate understanding, identical reference numerals have been used, where possible, to designate identical elements that are common to the figures.

DETAILED DESCRIPTION

1. Background

To elucidate the principles in accordance with the present invention, it is indeed instructive to first cover in an overview manner the foundational principles of a CDMA system based upon OOC's as applied to an optical system. These teachings have been set forth in detail in U.S. Pat. No. 4,779,266, which has one inventor in common with the inventor of the present subject matter (namely, J. A. Salehi). The teachings of '266 are incorporated herein by reference, but are disclosed in sufficient detail so as to make the present description essentially self-contained. Moreover, only the teachings that are especially pertinent to the present invention are set forth herein with an emphasis on the instant inventive subject matter.

Figure 1:
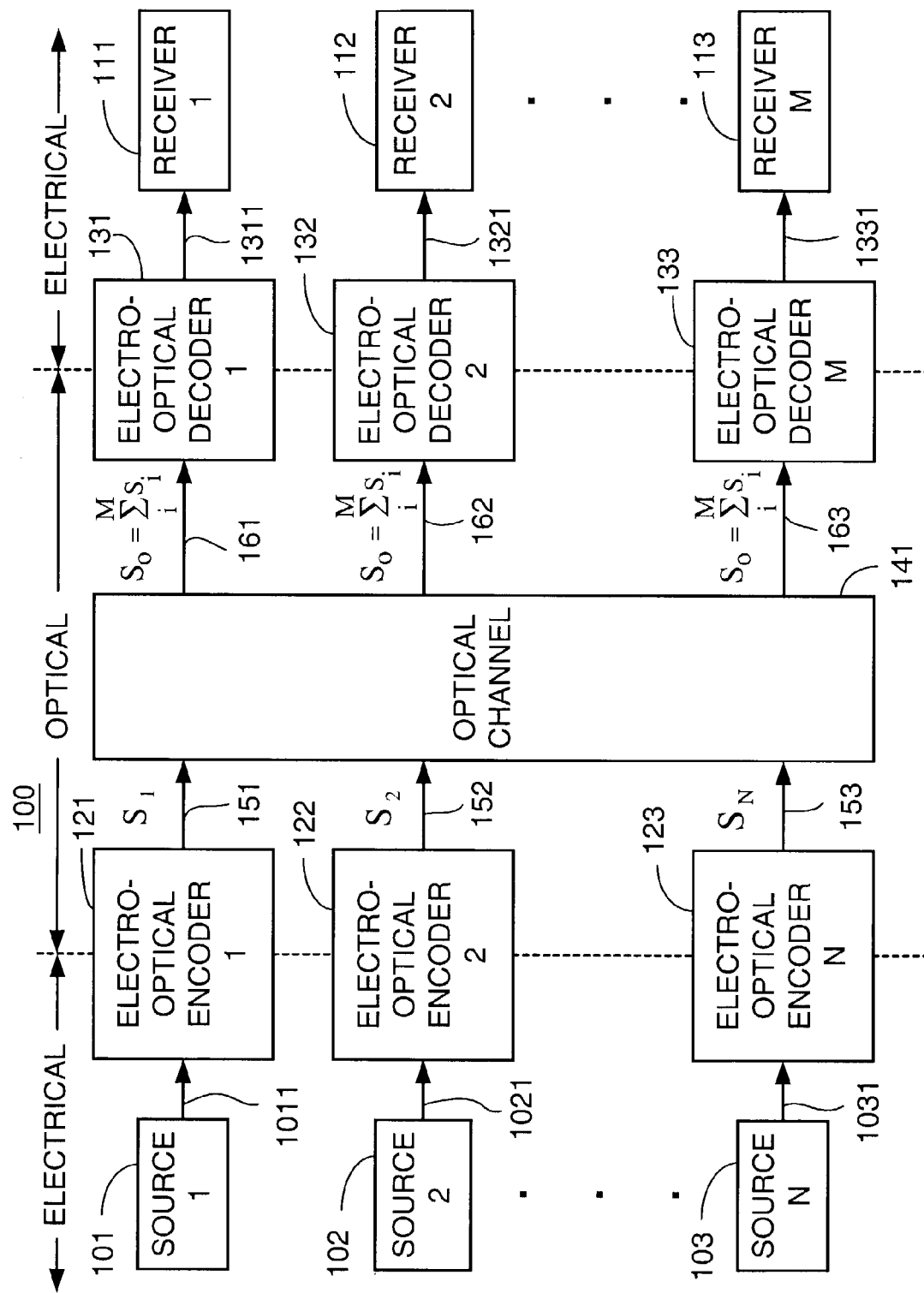
FIG. 1 depicts, in block diagram form, the electro-optical communication system under consideration in accordance with the present invention.

The general multiple user system 100 under consideration is depicted in block diagram form in FIG. 1. In system 100, N sources 101,102, . . . , 103 are arranged to communicate with M receivers 111, 112, . . . , 113 over interposed optical channel 141. Sources 101–103 are coupled to channel 141 via electro-optical encoders 121–123, respectively. In addition, electro-optical decoders 131–133 also couple the channel signals to receivers 111–113, respectively. Each encoder 121, 122 or 123, besides performing an encoding function, also converts electrical input signals to optical output signals. Similarly, each decoder 131, 132 or 133, besides effecting a decoding function, is also arranged to convert optical input signals to electrical output signals. The optical portion of system 100 is shown generally as between the dashed lines that intersect, respectively, the encoder blocks and the decoder blocks.

Oftentimes system 100 is configured with more than one source but only one receiver; this is the so-called multiple access configuration. Alternatively, in the so-called broadcast mode, there is just a single source but many receivers. The encoding and decoding techniques in accordance with the present invention are applicable to the broadcast mode and the multiple access mode as well as the general configuration of system 100 in FIG. 1 since N and M may either be fixed over the life of the system or they may vary dynamically if required.

The channel under consideration, as exemplified by optical channel 141, is of the type that propagates only two-level or two-state digital signals, such as a logic zero (a "space") and a logic one (a "mark"). To match this channel characteristic, signals emanating from encoders 121, . . . , 123 on leads 151, . . . , 153, designated by signature signals $S_i$, i=1, . . . , N, respectively, provide a stream of two-level or mark and space signals. Each $S_i$ stream corresponds to a similar stream produced by each source 101, . . . 103, respectively, as discussed shortly. Since channel 141 only supports two-level signals, if one or more encoders 121–123 propagate logic one signals over channel 141 during the same time duration, the channel level remains a logic one. The channel level is logic zero if all outputs of $S_i$, i=1, . . . , N, are zero during the same time duration. In a logical sense, channel 141 behaves as an "inclusive OR" channel.

The composite signal on channel 141 due to all $S_i$'s is the superposition of all $S_i$'s and is represented by $$S_o = \sum_i^N S_i$$

where the summation is treated in the inclusive OR sense. Each lead 161, . . . , 163 emanating from channel 141 in FIG. 1 serves as an input to and provides composite signal $S_o$ to decoders 131, . . . , 133, respectively. It follows from this description that all signatures $S_i$, i=1, . . . , N share substantially the same frequency band on channel 141.

Generally, each signature signal $S_i$, i=1, . . . , N is unconstrained in time in that each source 101, . . . , 103 may initiate a transmission or information interchange at any time, independently of the other sources. Thus, there is no requirement of synchronization between or among autonomous sources 101–103. However, each encoder 121, . . . , 123, for effective communication, must be in synchronism with its corresponding source 101, . . . , 103, respectively.

Typically, one or more decoders 131, . . . , 133 respond to a predetermined encoder 121,122, or 123. For simplicity, it is assumed that there is a one-to-one relationship between, say, encoder 121 and decoder 131, encoder 122 and decoder 132 and so forth. Also, even though there is no required synchronization between or among autonomous decoders 131–133, each receiver 111, . . . , 113 is synchronized with its associated decoder.

The synchronization relation between each encoder-decoder pair is of utmost importance, as alluded to in the Background Section, so as to ensure peak system performance. The subject matter of the present invention treats the methodology and concomitant circuitry to rapidly achieve such synchronism, as will presented in detail shortly.

Figure 2:
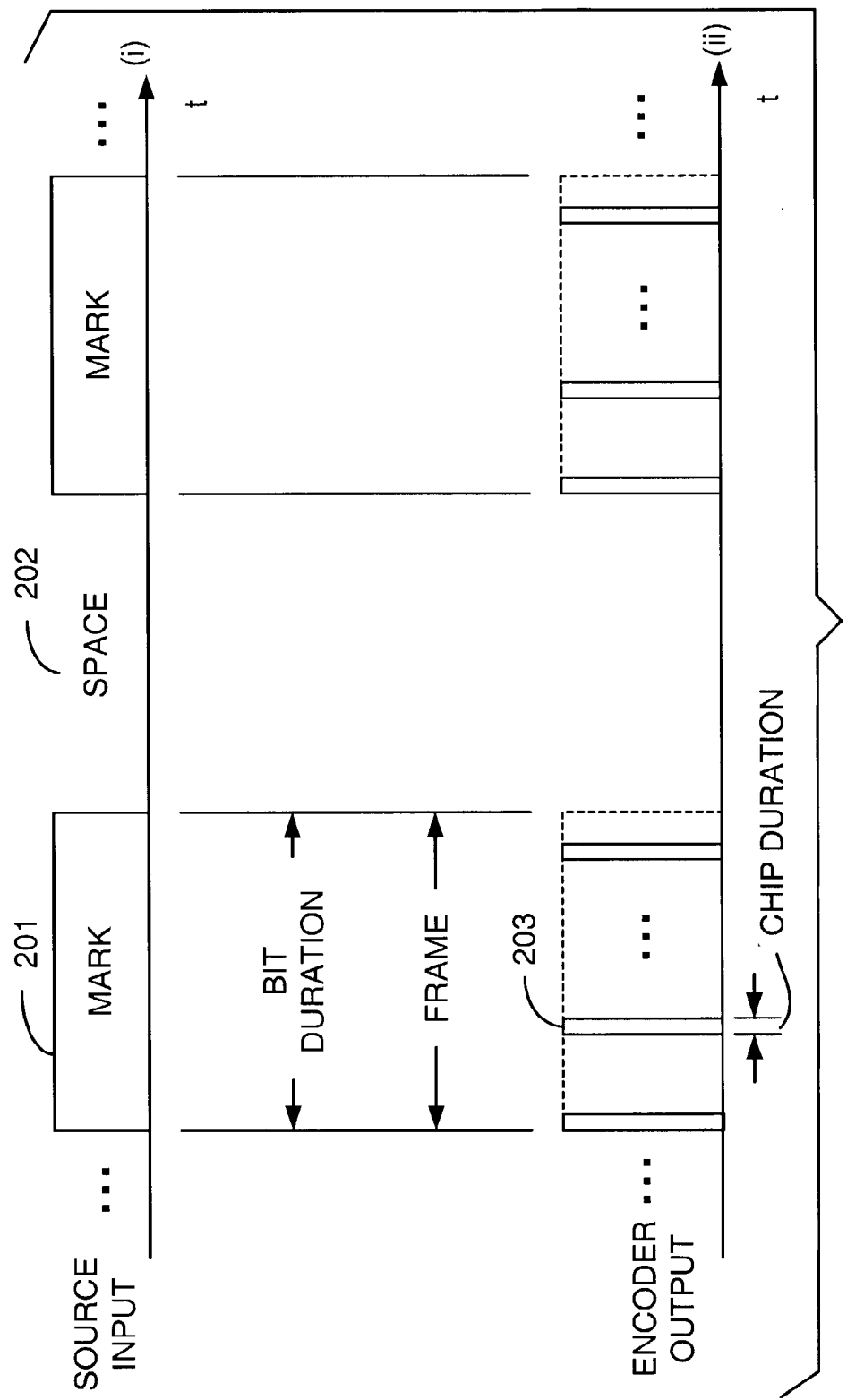
FIG. 2 depicts the relationship between the incoming electrical signal and the rate-increased optical signal propagated by any of the encoders of FIG. 1.

The primary function of each encoder 121, . . . , 123 is that of converting each logic one received from each corresponding source 101, . . . , 103 to a predetermined rate-increased stream of logic ones and logic zeros, as depicted generically in FIG. 2. Line (i) in FIG. 2 depicts three contiguous data bits, namely, a "mark-space-mark" sequence appearing in the output stream of, say, source 101 or the input stream to encoder 121. The time interval of either a mark (e.g., 201) or space (e.g., 202) is designated as a bit duration.

Line (ii) in FIG. 2 represents an output pulse stream, say $S_i$ from encoder 121, corresponding to the line (i) input stream. As shown, a rate-increased stream of logic one and logic zero pulses, which is replicated for all other marks produced by source 101, is generated by encoder 121. Since channel 141 is, illustratively, an optical medium, the logic one levels in output stream $S_i$ correspond physically to light or photon pulses.

In the rate-increased or optical portion of system 100, a frame corresponds to a bit duration, and the time interval of a logic one light pulse or a logic zero (no light pulse) is designated the chip duration (e.g. 203). Thus, each frame is composed of a fixed number of so-called "chips"; three logic one chips occur during each mark frame in FIG. 2. The envelope of the mark frames is shown by the dashed rectangles on line (ii) of FIG. 2.

In order to communicate effectively within system 100, each signature $S_i$, i=1, ..., N, as produced by its assigned encoder in response to an input mark, may not be selected arbitrarily, but must be carefully chosen to achieve efficient, error-free communication. This means basically that each $S_i$ must be selected in view of all the other $S_j$'s based on such considerations as number of sources N and the bandwidth of channel 141. These considerations, in turn, depend on the communication requirements or transmission characteristics. Sets of signatures $S_i$, i=1, ..., N which realize optimal information interchange for a given number of chips and sources are discussed below.

The essential function of each decoder 131, ..., 133 is that of discriminating within the composite signal $S_o$ the preassigned signature associated with each decoder 131, ..., 133. In one illustrative embodiment, each decoder 131, ..., 133 is implemented by optical tapped delay lines arranged along channel 141. The optical separation among taps for each decoder corresponds to the distribution of logic one chips in the signature preassigned to the decoder. Thus, whenever a mark is transmitted, each tap in a given decoder extracts a high-peak signal whenever the logic one chips in the preassigned signature propagating as part of $S_o$ are aligned with the taps. In this way, a so-called peak correlation manifests the arrival of the preassigned signature and, in turn, the propagation of a mark by the source having the same preassigned signature. A decoder illustrative of these principles is presented shortly.

The above overview description with reference to FIGS. 1 and 2 provides a basic background. The following sections elaborate on certain elements of the basic background, particularly those elements representative on encoders 121–123 and decoders 131–133.

1.2 Optimizing Orthogonal Codes (Optical Orthogonal Codes in an Optical Application)

For clarity of exposition, it is helpful first to consider one particular example of optimizing orthogonal code sets. The reason is two-fold, namely: it affords the opportunity to introduce terminology and notation and, in addition, provides a heuristic basis for the general synchronization principles to be elucidated.

1.2.1 Heuristic Basis

Figure 3:
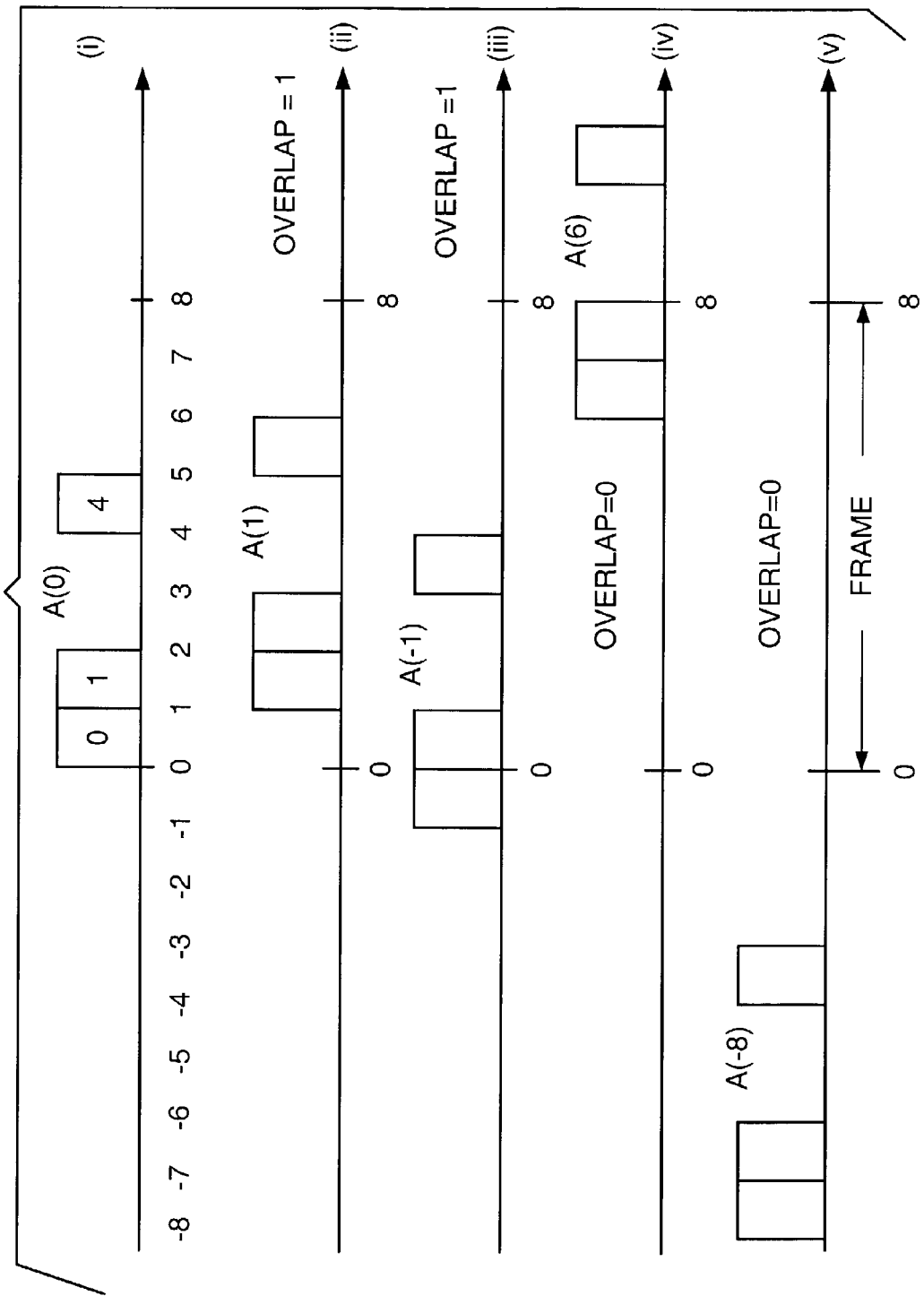
FIG. 3 illustrates the operation of shifting one code pattern relative to a fixed version of the same code pattern to produce the auto-correlation evaluation of the code pattern.

With reference to FIG. 3, the code pattern depicted on line (i) has non-zero entries for the intervals (0,1), (1,2) and (4,5). In general, there is the potential for eight code entries in the frame interval (0,8) and these entries, when present, are labeled by '0' for the (0,1) interval, '2' for interval (1,2), ..., and '7' for interval (7,8). For the code pattern of line (i), only entries '0', '2' and '4' are non-zero, and these are labeled accordingly. Code entries have the normalized height of one unit or a logic one level. The code pattern on line (i) is designated by A(0).

Line (ii) of FIG. 3 depicts the same code pattern shifted one unit to the right and, therefore, is designated as pattern A(1). Lines (iii), (iv) and (v) depict, respectively: a left-shift of one unit (A(−1)); a right-shift of six units (A(6)); and a left-shift of eight units (A(−8)).

In comparing line (i) of FIG. 3 to line (ii) of FIG. 2, it is realized that the code pattern A(0) may represent one particular rate-increased signature $S_i$, i=1, ..., N, wherein such $S_i$ has a normalized chip duration of one unit and a normalized frame duration of eight units or eight chips. It is convenient then to continue the discussion on a normalized basis, realizing that denormalization may be readily effected.

Comparison of line (i) with line (ii) of FIG. 3 indicates that the code patterns "overlap", that is, have a common chip, only in the interval (1,2). Thus, A(1) is said to overlap A(0) in one position and this is tabulated on line (ii) as OVERLAP=1. Similarly, for lines (iii)–(v), the overlaps are given, respectively, by 1,0, and 0. Hence, A(−1) overlaps A(0) in one position whereas A(6) relative to A(0) as well as A(−8) relative to A(0) have no overlaps. It is possible to vary the given code pattern from A(−8) to A(8) according to the scheme A(−8),A(−7), ..., A(0), ..., A(8) and evaluate the overlap relative to a fixed A(0); when this is accomplished, the following truncated sequence or array of seventeen OVERLAP values is generated: $R_A$={0,0,0,0,1,1,0,1,3,1,0, 1,1,0,0,0,0}. The maximum value of the elements of $R_A$ is three and it occurs when A(0) is evaluated relative to A(0). Also, no other element value is greater than one.

By way of terminology, an auto-correlation evaluation is defined as the operation of shifting a code pattern across a stationary version of the same code pattern to form the truncated sequence of overlap values. As exemplified above, the auto-correlation evaluation of A(0) yields $R_A$. To simplify further, the notation AA=$R_A$ is used to indicate that the auto-correlation of the code pattern A(0) yields $R_A$.

To generalize these principles, it is supposed that a code pattern, designated S, has w non-zero entries. Then SS yields $R_s$ having elements such that the maximum value of the elements in $R_s$ is w, or max ($R_s$)=w. (From above, max ($R_A$)=3, as expected for A(0)). The values of the remaining elements of $R_s$ are not immediately apparent since, in general, the specific code pattern S must be known to form the specific $R_s$. However, it is possible to generate certain code patterns so that all other element values are either zero or one while still retaining max ($R_s$)=w. (From above, the code pattern A(0) exhibits these characteristics).

The significance of these codes resides in the fact that they ensure maximum separation for signal detectability within a decoder. For instance, with reference to FIG. 1, let $S_1$=A(0) and suppose only $S_1$ is propagating over channel 141, that is, $S_o$=$S_1$=A(0) for each frame. Then, if any decoder 131, ..., 133 is connected to channel 141 with tap positions corresponding to the non-zero code entry locations of A(0), that is, three taps wherein the second and third taps are spaced apart two and three chip durations, respectively, following the first tap, then the three taps will simultaneously sense different propagating photons during one and only one chip duration and thereby provide a cumulative signal level of w=3 in the detector. This corresponds, in effect, to evaluating the overlap of A(0) relative to A(0). During all other chip intervals, at most one tap will sense a chip pulse (corresponding to evaluating the overlap of A(k) relative to A(0) for k=−8, −7, . . . , −1,1, . . . ,7,8). A threshold device in the given decoder could be set at, say, a normalized level of 2 units and a threshold crossing would indicate a signature has been received by the decoder.

It was presumed in the above discussion that during an auto-correlation evaluation, shifts occurred in unit intervals so, for instance, A(½) was undefined. In a system implementation, effects of non-unit shifts are mitigated because of system synchronization in accordance with the present invention.

Figure 4:
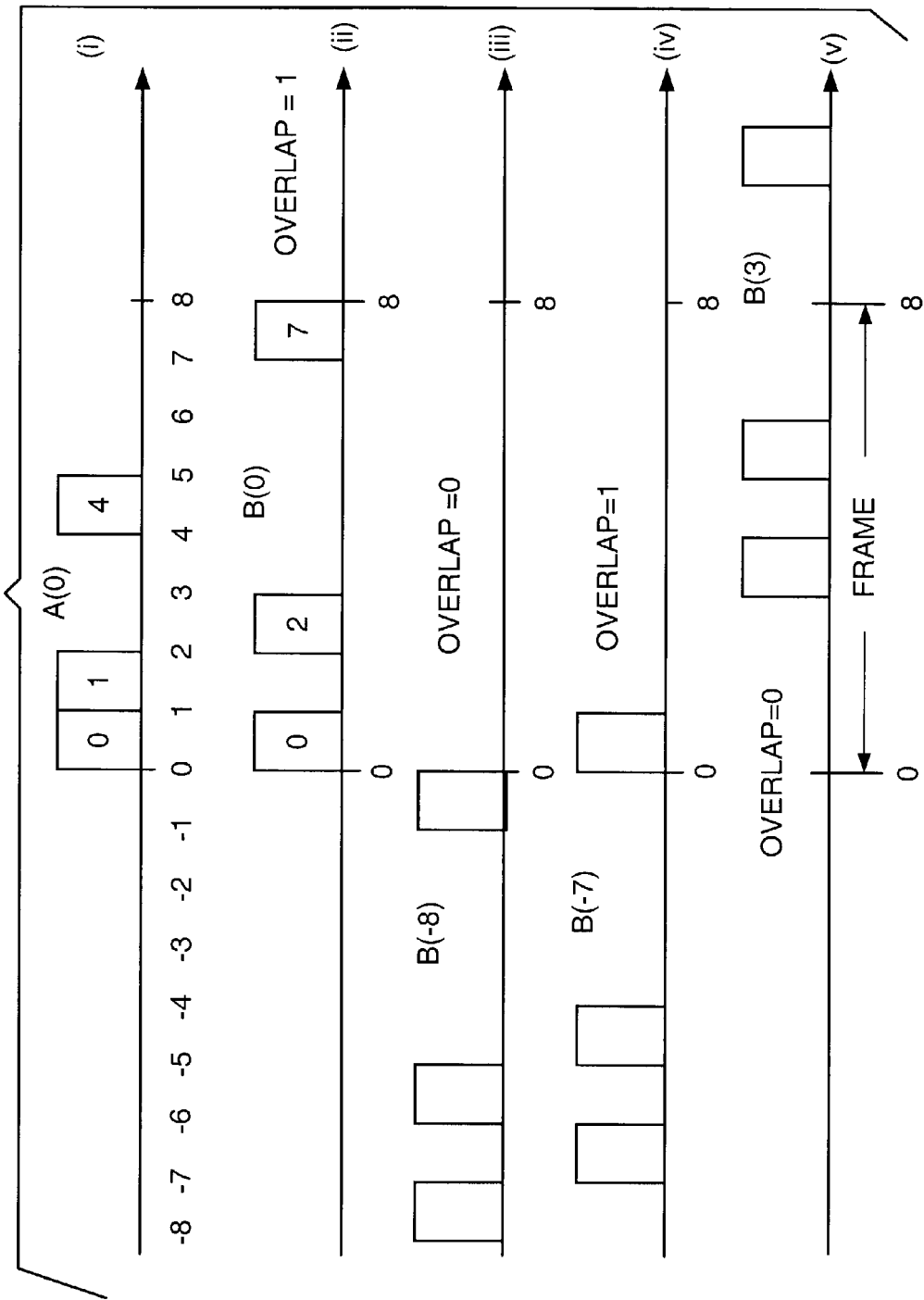
FIG. 4 illustrates the operation of shifting one code pattern relative to a second, fixed code pattern to produce the cross-correlation evaluation of the two code patterns.

Although the auto-correlation property of certain codes provides a significant difference between the maximum value and all other values in the OVERLAP array, it is equally important for a multiple source system that an additional property be exhibited by the code patterns. To demonstrate this property, reference is made to FIG. 4. In line (i) of FIG. 4, the same A(0) code pattern studied in FIG. 3 is repeated here for ready reference. A second code pattern, designated B(0), is shown on line (ii) of FIG. 4. In the same manner as discussed above, it is possible to evaluate the overlap of B(0) with A(0), which yields OVERLAP=1 as tabulated on line (ii). Again, it is possible to shift B(0) either left or right from −8 to +8. Lines (iii)–(v) depict B(−8), B(−7) and B(3), respectively, with corresponding OVERLAPS of 0, 1, and 0 relative to A(0). When B(0) is fully shifted from left to right relative to A(0) and the corresponding overlap values collected to form a truncated sequence $R_{BA}$, then $R_{BA}$ has the following elements: $R_{BA}$={0,1,1,0,0, 1,1,1,1,1,0,1,0,0,0}. It is noted that max ($R_{BA}$)=1 and the elements of $R_{BA}$ are either 0 or 1.

Again, by way of terminology, a cross-correlation evaluation is defined as the operation of shifting one code pattern of a given frame duration across another stationary code pattern of the same duration to form the set of overlap values. As exemplified above, the cross-correlation of B(0) relative to A(0) yields $R_{BA}$. To simplify further, the notation BA=$R_{BA}$ indicates the cross-correlation of code pattern B(0) with A(0). The cross-correlation yields a maximum overlap of one chip.

The significance of the cross-correlation property of these special code patterns lies in the fact that they mitigate interference during the signature detection process. For instance, with reference to FIG. 1, let $S_2$=B(0) and suppose only $S_2$ is propagating over channel 141, that is, $S_o$=$S_2$=B(0) for each frame. Then, if any decoder 131, . . . ,133 is connected to channel 141 with tap positions arranged to detect A(0), then at most one decoder tap will sense propagating photons during each chip duration. This corresponds to evaluating the overlap of B(0) relative to A(0). Thus, a threshold device set to a normalized level of 2 units in the decoder would not detect a threshold crossing and, consequently; the propagating B(0) signature is not detected by the A(0)-arranged decoder.

1.2.2. General Code Properties

In the preceding section, certain generalized properties were introduced during the discussion of the correlation evaluations. These properties are now formally defined.

A (n, w, $\phi_a$, $\phi_c$)-optimizing orthogonal code C is a family of (0,1)-sequences of length n which satisfies the following two properties:

(i) the auto-correlation property:

$$\sum_{j=0}^{n-1} x_j x_{j+m} \leq \phi_a \text{ for any } x \text{ contained in } C \text{ and } m \text{ an integer, } 0 < m < n;$$

$$\sum_{j=0}^{n-1} x_j x_{j+m} = w \text{ for any } x \text{ contained in } C \text{ and } m = 0;$$

(ii) the cross-correlation property:

$$\sum_{j=0}^{n-1} x_j y_{j+m} \leq \phi_c \text{ for any } x \neq y \text{ contained in } C \text{ and any integer } m.$$

The auto-correlation property implies that each n-tuple $X=(x_0, x_1, \ldots, x_{n-1})$ in C has weight w, that is, it has exactly w 1's. The subscripts of the x's and y's in the correlation equations are reduced modulo n, but the summations and the multiplications in the calculation of the correlations are done in the real field (i.e., they are not reduced by any modulus). The numbers $\phi_a$ and $\phi_c$ are the auto-correlation and cross-correlation constraints. The (0,1) sequences of an optimizing orthogonal code are called its code word (for example, X or Y). The size of an orthogonal code, denoted |C|, is the number of code words in it. Since each code word has weight w, the auto-correlation of any sequence for 0<m<n, and the cross-correlation between any two sequences for any m are necessarily less than or equal to w.

As an example illustrating these properties, the A(0) and B(0) signatures from the previous section are actually two sub-patterns from a (13,3,1,1) orthogonal code. (A(0) and B(0) are sub-patterns since the actual frame duration for this code is 13 chips; in FIGS. 3 and 4, only the entries through the eighth chip duration were considered to reduce the complexity of the discussion). In formal terms, $S_1$={0,1,4} and $S_2$={0,2,7} form an orthogonal code (13,3,1,1) with two code patterns or signatures.

It is desirable to have a large optimized orthogonal code in order to support information interchange among numerous sources. For a given set of values n, w, $\phi_a$ and $\phi_c$, the largest possible size of an (n, w, $\phi_a$, $\phi_c$)-orthogonal code is denoted by $\theta$(n, w, $\phi_a$, $\phi_c$). An optimized orthogonal code having the maximum size is said to be maximal. The TABLE lists some maximal codes for various values of n, but with w fixed at three and $\phi_a$ and $\phi_c$ equal to one, that is, $\theta$(n,3,1,1):

TABLE

| n | $\theta$(n,3,1,1) |
|---|---|
| 13 | {0,1,4},{0,2,7} |
| 19 | {0,1,5},{0,2,8},{0,3,10} |
| 25 | {0,1,6},{0,2,9},{0,3,11},{0,4,13} |
| 31 | {0,1,7},{0,2,11},{0,3,15},{0,4,14}{0,5,13} |

Methods for generating codes are disclosed in U.S. Pat. No. 4,779,266.

1.2.3 One Illustrative Embodiment of a Detector

To detect the types of code patterns propagating on channel 141 of FIG. 1, one implementation for any decoder 131,132 or 133, say decoder 131, as depicted in block diagram form in FIG. 5A may be utilized. The description that follows assumes that the particular decoder is in synchronism with its associated encoder; how this is accomplished will be elaborated upon shortly.

Taps 201–203 on channel 141 are positioned according to the time distribution of the preassigned code pattern. For instance, if decoder 131 is arranged to detect the A(0) pattern, taps 202 and 203 are spaced apart 2T and 3T seconds in time, respectively, from tap 201, or in terms of optical length, the distance traveled by a pulse in 2T and 3T seconds. The positioning of the taps relative to an A(0) frame during one instant of the detection process is illustrated by the FRAME time diagram above channel 141 in FIG. 5A.

Taps 201–203 feed corresponding optical photo-detectors 211–213 and the individual outputs of these photo-detectors serve as inputs to integrators 221–223, respectively.

A channel signal $S_0$ on channel 141 having an embedded code pattern corresponding to the tap positions generates a detectable signal at the output of each photo-detector for the chip duration. Each corresponding integrator sums the output of the photo-detector for a prescribed time interval, typically the chip duration. The outputs of integrators 221–223 are combined via summer 1312. This accumulated signal is then provided to threshold comparator 1313 for comparison to a predetermined threshold. In terms of the previous discussion, if detector 131 is arranged to detect A(0) patterns, then the appearance of an $A_{(0)}$ frame in $S_O$ simultaneously provides a normalized signal of one unit at the end of the integration period from each integrator 221–223, respectively. Accordingly, summer 1312 registers a three unit output, and if the threshold is set to a normalized value of two units, the detection of this mark frame in comparator 1313 is indicated by enabling decoder 1315. Decoder 1315 performs a rate-decreasing operation to restore the original data rate. Each time decoder 1315 is enabled, lead 1311 registers a logic one at the original data rate.

If, however, the channel signal $S_O$ is composed of only B(0), then only one integrator per chip duration senses an overlap and the summer never exceeds one unit. Thus, comparator 1313 provides a logic zero to lead 1311.

It is apparent that integrators 221–223 and summer 1312 should be reset at the beginning of each chip duration. This reset operation is controlled by sync/reset circuit 1314, via lead 1316, in the usual manner for electronic correlation-type detectors. Furthermore, circuit 1314 maintains encoder-decoder pair synchronism via an initial training session, as discussed in the Section 2 below. Frame synchronization is supplied to decoder 1315, also via lead 1316 from circuit 1314.

1.2.3 Another Illustrative Embodiment of a Detector

Figure 5B:
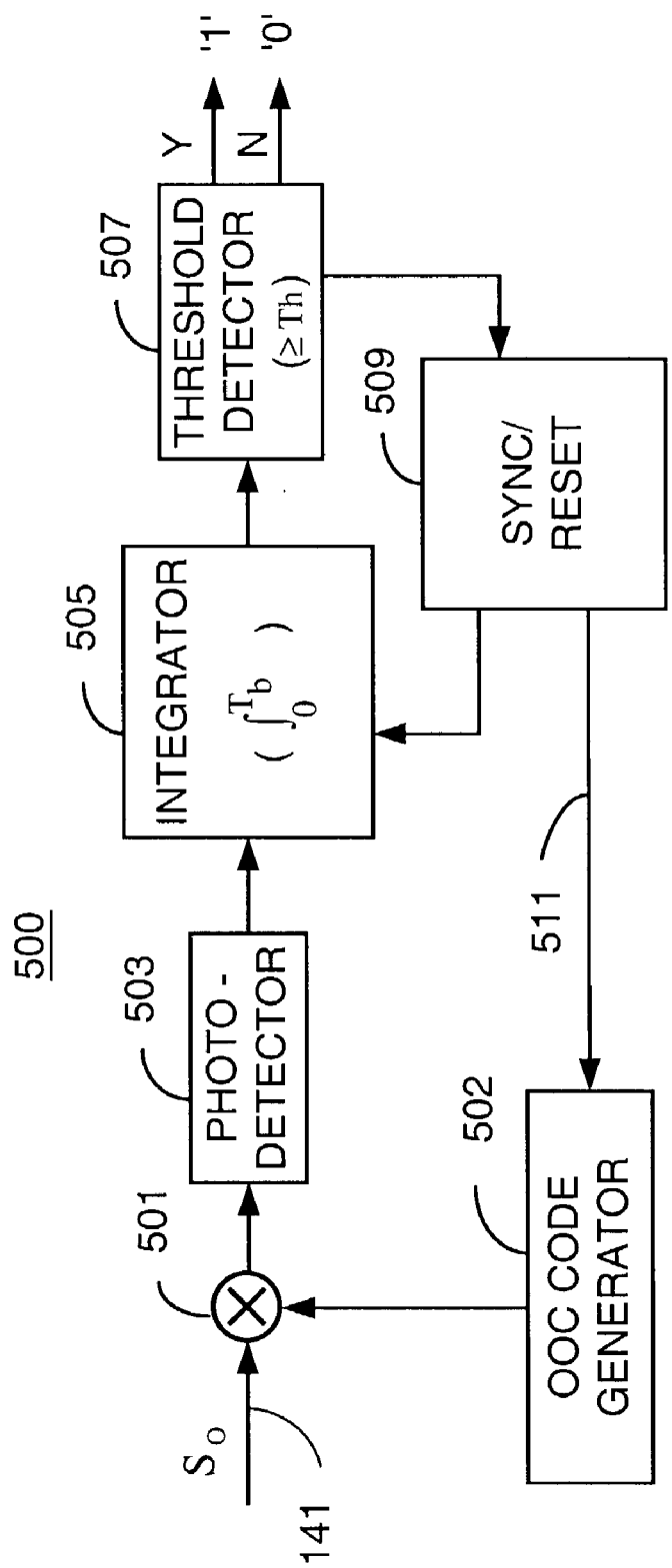
FIG. 5B is a block diagram depicting a block diagram of an illustrative embodiment of another decoder in FIG. 1.

With reference to FIG. 5B, there is shown system 500 which is another illustrative embodiment of decoder 131 representative of a decoder most compatible with the principles of the present invention, as described in detail in Section 2. In system 500, OOC code generator 502 and multiplier 501 serve the same function as the set of optical taps in FIG. 5A; moreover, the interval of integration of integrator 505 is over the bit duration ($T_b$) of FIG. 1, the reason for which is now described. Generator 502 produces the code pattern assigned to the particular decoder (e.g., 11001000), and sequentially presents the code symbols present in the pattern at the chip rate to multiplier 501. At the same time, the signal on channel 141 ($S_o$) serves as a second input to multiplier 501. During each chip interval, the signal present on channel 141 is multiplied by the corresponding symbol from the code pattern to produce an output (either a '0' (no light pulse) or a '1' (a light pulse)), with such output serving as an input to photo-detector 503. Photo-detector 503 converts the light energy into an electrical signal and, in turn, the electrical signal is coupled to integrator 505. The integrator sums the electrical energy present during the bit duration $T_b$, and the output of integrator 505 is coupled to threshold detector 507 (having a threshold level of Th). Whenever the integrator output is greater than or equal to Th, detector 507 outputs a '1' electrical bit representative of a "mark"; on the other hand, if the integrator output is less than Th, then a '0' electrical bit representative of a "space" is outputted. Finally, sync/reset circuit 509 provides the synchronization and reset signals to re-circulate the OOC code pattern from generator 502 and to re-initialize integrator 505. Circuit 509, which receives its input from detector 507, is set during a "training" phase as detailed in Section 2.

2. Embodiment in Accordance with the Present Invention 2.1 System Model

The system depicted in FIG. 1 is now recast in the time domain in order to provide for tractability and succinctness in the describing the principles of the present invention. The general structure of an OOC-CDMA network 600 is shown in FIG. 6.

Figure 6:
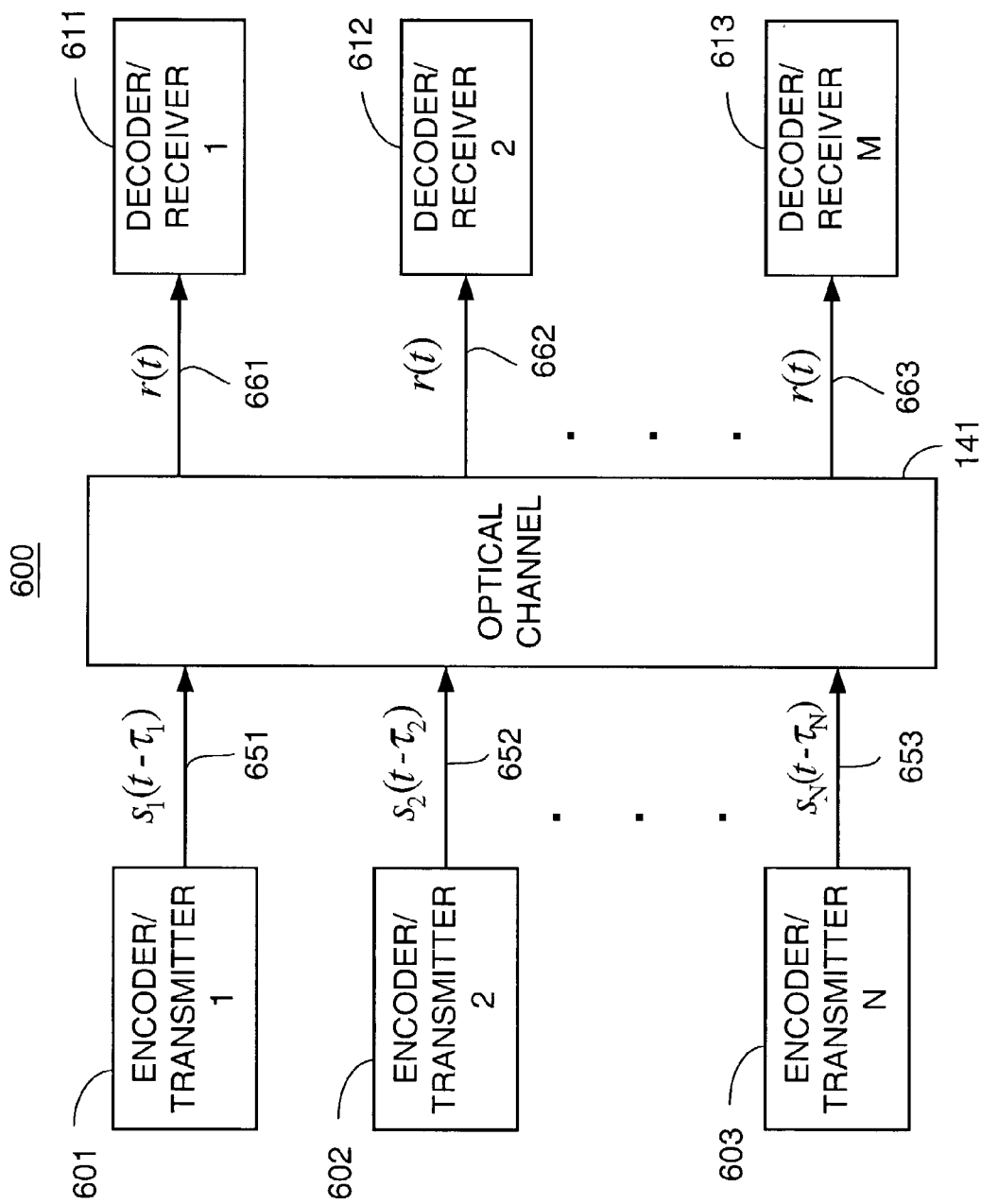
FIG. 6 is a recast version of the system of FIG. 1 so the detailed description may be tractably presented in the time domain.

At the input of FIG. 6, element 601 represents the combination of source 101 and encoder 121 of FIG. 1; similarly, elements 602 and 603 represent, respectively, the combination of source 102/encoder 122 and source 103/encoder 123 of FIG. 1. The signal from encoder/transmitter 601 appearing on path 651 is denoted as $s_1(t-\tau_1)$; signals on paths 652 and 653 are labeled in correspondence to the signals provided by elements 602 and 603. All input signals feed optical channel 141 which, as before, is arranged as a star network.

At the output of FIG. 6, element 611 represents the combination of decoder 131 and receiver 111 of FIG. 1; similarly, elements 612 and 613 represent, respectively, the combination of decoder 162/receiver 112 and decoder 133/receiver 113. The received optical CDMA signal r(t) emanating from channel 141 appears concurrently on paths 661, 662, ..., 663 and is composed of the different input signals as follows:

$$r(t) = \sum_{n=1}^{N} s_n(t - \tau_n) \tag{1}$$

where N is the total number of users in the system and $\tau_n \in [0, T_b)$ is the delay associated with the nth user. Also, $s_n(t)$ is the signal of nth user which has the following form:

$$s_n(t) = \sum_{i=-\infty}^{\infty} b_i^{(n)} c_n(t - iT_b) \tag{2}$$

where $b_i^{(n)}$ is the ith bit of nth user ($b_i^{(n)} \in \{0,1\}$), $c_n(t)$ is the code pattern or code word associated with the nth user, and $T_b$ is the bit duration. In addition, $c_n(t)$ is defined as follows:

$$c_n(t) = \sum_{j=0}^{F-1} a_j^{(n)} P_{T_c}(t - jT_c) \quad (3)$$

where F is the code length and $T_c$, which represents chip interval, is 1/F of bit duration, i.e $T_b = FT_c$. Finally, $P_{T_c}(t)$ is a rectangular pulse defined as follows:

$$P_{T_c}(t) = \begin{cases} 1 & 0 \le t < T_c \\ 0 & \text{otherwise} \end{cases} \quad (4)$$

and $(a_0^{(n)}, a_1^{(n)}, \ldots, a_{F-1}^{(n)})$ with each $a_j^{(n)} \in \{0,1\}$ is the OOC code pattern of nth user. In this description, OOCs with length F (in contrast to n in Section 1), weight K (in contrast to w in Section 1), and auto-correlation and cross-correlation values bounded by one are deployed.

It is required that the receiver knows the exact shift of each desired user's (e.g., encoder/transmitter 601) OOC pattern in order to decode the transmitted bits correctly. It is the task of the synchronization system to determine this correct shift or equivalently estimate the desired user's delay. However, as the delay can take on a continuum of values within its uncertainty region, generally the synchronizer would be required to perform the impossible task of checking the uncountable infinity code shifts to find the correct shift position.

2.1 Heuristic Example in Accordance with the Present Invention

With reference to FIG. 7A, there is shown on line (i) the OOC codeword {0,1,4} listed in the first row of the Table in Section 1.2.2 (that is, the first codeword for $\theta(13,3,1,1)$).

Suppose that this codeword is assigned to decoder/receiver 611, and further suppose that channel 141 delays this codeword by two chip intervals (i.e., $2T_c$) so that the input r(t) to decoder/receiver 611 is shown on line (ii) of FIG. 7A. It is desired to synchronize decoder/receiver 611 so that device 611 may properly detect the codeword, that is, to ensure that decoder/receiver 611 properly accounts for the delay introduced by channel 141.

Form the summation of 3 different shifts of the desired user's code. To do this for the example, consider the codeword itself as shown on line (i), the codeword of line (i) shifted by one chip interval, and the codeword of line (i) shifted by two chip intervals, as shown in lines (iii), (iv), and (v), respectively, of FIG. 7A. Finally, as depicted by line (vi), combine the patterns of lines (iii), (iv), and (v), recalling that when any one of the symbols of the codeword falls within any one of the chip intervals, the composite pattern also exhibits a symbol. For instance, code symbol "0" from line (iii) falls in chip interval (0,1), so the composite pattern has a code symbol. Moreover, the code symbol "1" from line (iii) and the code symbol "0" from line (iv) fall within (1,2), so the composite pattern has a code symbol. And so forth Next, consider the depiction of FIG. 7B. Lines (i), (ii), and (iii) are the same as lines (i), (ii), and (vi), respectively, of FIG. 7A and are shown for references purposes.

Now, consider shifting the composite code pattern by 3 chip intervals 5 times, where line (iii) represents one of the shifts. The four remaining shifts are shown, respectively, in lines (iv), (v), (vi), and (vii) of FIG. 7B. Line (vi) depicts that, rather than a linear shift of the composite code pattern, the part of the composite code pattern that would appear in interval beyond chip interval (12,13) is "wrapped around" and appears for computational purposes in the interval (0,3). Similarly, for line (vii), code symbols appearing beyond chip interval (12,13) wrap around and appear in the chip intervals encompassed by (0, 6). The part of composite code pattern extending beyond chip interval (12,13) that is wrapped around is shown as dashed on lines (vi) and (vii).

Also shown on each line (iii)–(vii) is the result, designated as OVERLAP, which obtains by computing the overlap of each line (iii), . . . , or line (vii) with the code symbols of line (ii). For instance, the OVERLAP=3 for line (iii), OVERLAP=2 for line (iv), . . . , and OVERLAP=2 for line (vii).

Suppose, randomly, the five groups are picked so that the OVERLAP is computed in the order associated with lines (v), (vii), (vi), (iii), and (iv). The first computation yields OVERLAP=1, which is not greater than the threshold selected to be 2.0 for this example. The second computation yields OVERLAP=2, which again does not exceed the threshold. The third computation is OVERLAP=1 which is less than the threshold. The fourth computation yields OVERLAP=3, which is the first computation to exceed the threshold.

Figure 7B:
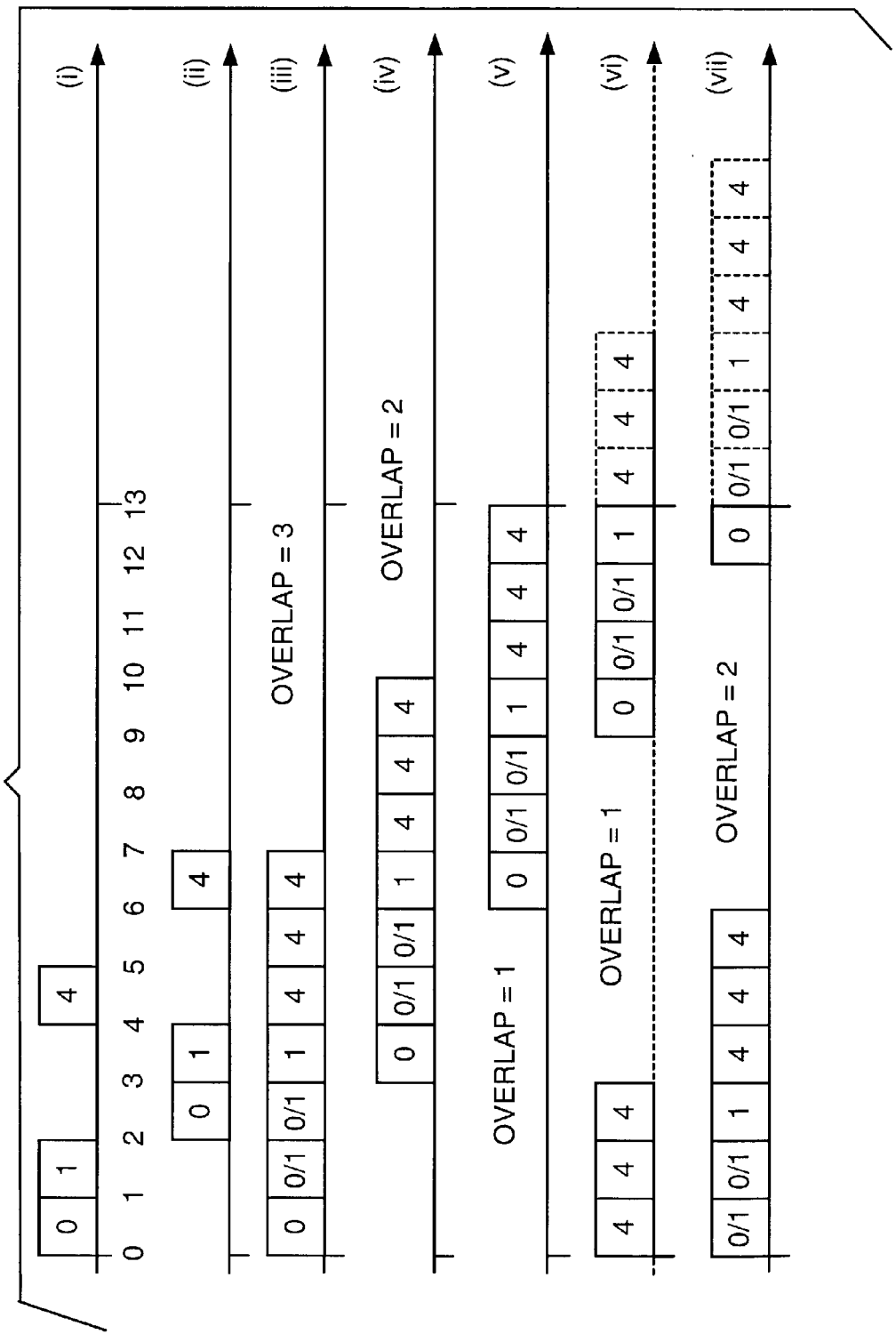
FIG. 7B is a pictorial representation of the coarse synchronization processing.

Because this last computation exceeds the threshold, this is a manifestation that one of the three shifts forming the composite pattern on line (iii) may be the correct shift position to achieve synchronization. Hence, each of the individual code patterns forming the shifted, composite code pattern is now examined separately, as exhibited with reference to FIG. 7C. Lines (i) and (ii) are a repeat of lines (i) and (ii) of both FIGS. 7A and 7B, shown for reference purposes. Line (iii) shows the first set of code symbols used to form the composite code pattern on line (iii) of FIG. 7B. Similarly, lines (iv) and (v) show the second set and third set, respectively, of code symbols used to form the code pattern. Also shown on each line (iii)–(v) of FIG. 7C is the result of computing the overlap of line (ii) with each line (iii)–(v), namely, OVERLAP=0, OVERLAP=1, and OVERLAP=3, respectively. Only the code symbols on line (v) produce an overlap value which exceeds the threshold of 2.0 for this example, so the shift in the code symbols of line (v) provide a direct indication of the delay introduced by channel 141, namely, the code symbols of line (v) is the code {0,1,4} delayed by two chip intervals. This delay data is necessary and sufficient to provide the required synchronization information to decoder/receiver 611.

2.2 Illustrative Algorithm

Figure 8:
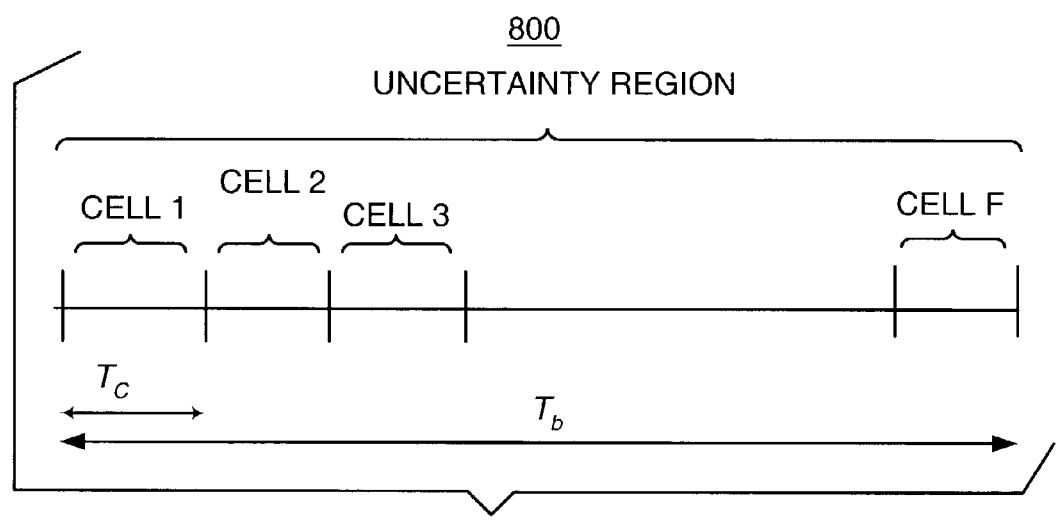
FIG. 8 depicts the technique for partitioning a frame into cells.
Figure 9:
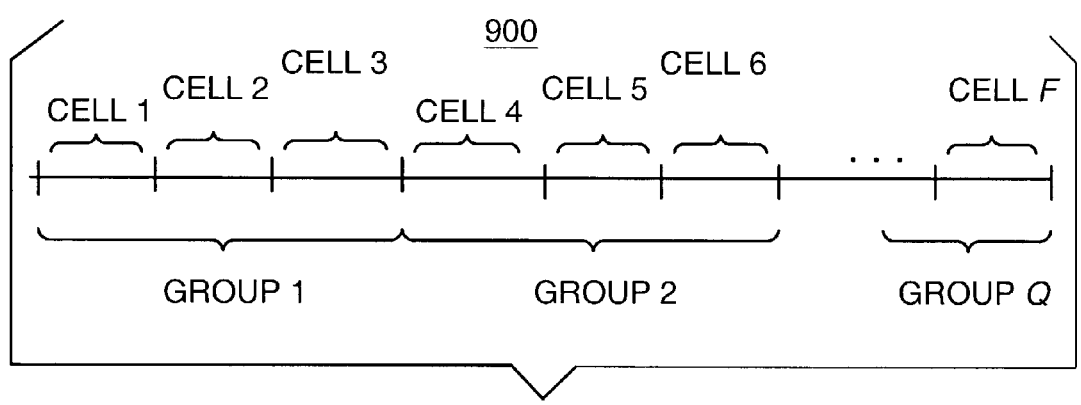
FIG. 9 depicts the technique for arranging subsets of cells into groups for coarse synchronization.

As alluded to in the foregoing example, a so-called uncertainty region $[0,T_b)$ is divided into F different cells (which are also called fragments and correspond to chip intervals), each having a duration of $T_c$ seconds; this terminology is illustrated by pictorial representation 800 of FIG. 8. Then subsets of the F cells are grouped in Q groups according to the relation:

$$Q = \left\lceil \frac{F}{L} \right\rceil, \quad (5)$$

where L is a shift parameter such that 1<L<F. Note that when L is not a divisor of F, Q is the upper closest integer to the ratio F/L and one of the groups will therefore have fewer elements; this terminology is illustrated by pictorial representation 900 of FIG. 9.

The technique in accordance with the present invention performs a search of the F cells to find the one within which the actual delay is located. In general, the technique is summarized as follows: (1) partition the uncertainty region into smaller cells called a group and perform a search to find the group (1, 2, . . . , or Q) which contains the correct shift; and then (2) estimate the exact value of the delay within this latter group. In other words, the estimation problem is transformed to a search or multiple-hypothesis testing part and a tracking part. The testing part is called "code acquisition" or "coarse synchronization". The tracking part is called "fine synchronization".

Once the synchronization process is described as a search problem, the strategy that the synchronization system should employ to perform this search must be selected. One conventional method is the popular technique of simple serial-search, i.e. the search starts from a randomly selected (or prespecified) shift and serially examines the other shifts in a prespecified order until the correct shift is found. It is known for this simple serial-search, that synchronization requires about half code length (F/2) bits to find the correct shift position.

In accordance with the present invention, however, the performance of the synchronization system is improved significantly with the more advanced and more efficient algorithm outlined above, namely the "multiple-shift algorithm", and now elaborated upon below.

The multiple-shift algorithm has an initializing phase and two processing stages. In the initialization phase, the F different shifts (or cells) in the search space are partitioned into Q basically equal-sized groups each containing L different shifts, as in equation (5).

In the first processing stage, one of the Q groups is selected in a random fashion. Then all the L shifts in that group are examined simultaneously, i.e. instead of correlating the received signal with only one single shift, it is correlated with the summation of L different shifts of the desired user's code in order to obtain the decision variable. Since the structure is linear with respect to the locally generated code pattern, the output will be the summation of each output due to each shift. If the decision variable created in this way does not exceed the threshold, all of the L shifts in that group are rejected and the next group is randomly selected and examined.

When the decision variable exceeds the threshold, it indicates that one of the L shift positions may be the correct shift position and the second processing stage commences. In the second stage, each of the L shift positions are examined separately, i.e. the first shift in the group is examined and if rejected, the next shift is considered until all the L shift positions in the group are examined. When all the L shifts are taken into account exclusively and rejected, the algorithm switches back to first stage and continues the search with the next group. Note that the thresholds used in the two stages may be different.

2.3 Second Heuristic Example

Figure 10:
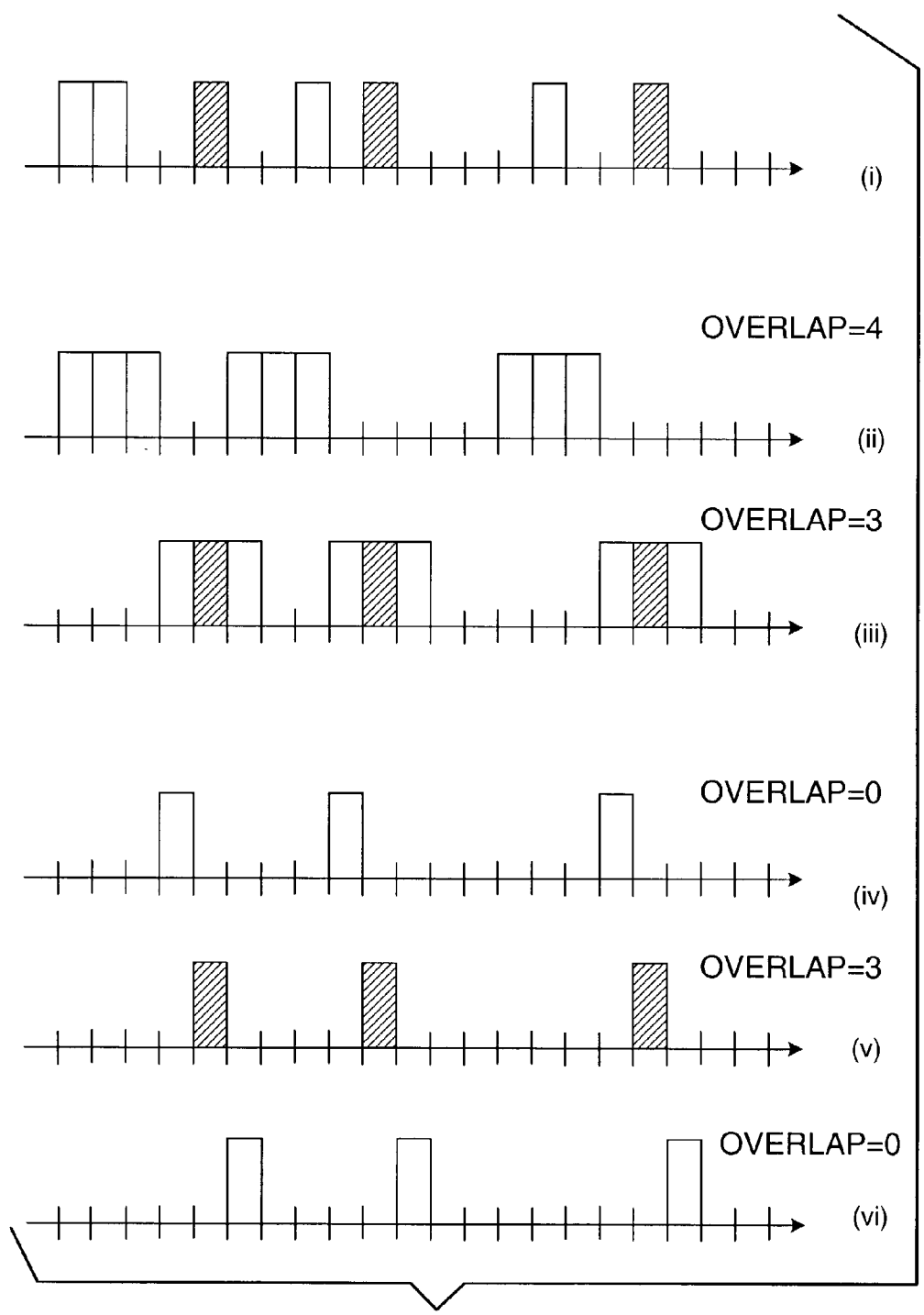
FIG. 10 is a pictorial representation of both the coarse and fine synchronization processing when multiple sources are concurrently transmitting.

With reference to FIG. 10, there is shown another example that expands upon the principles of the example of Section 2.1. In particular, it is now presumed that encoder/transmitters 601, 602, . . . , and 603 are operational in the system, and it required that each decoder/receiver 611, 612, . . . , or 613 obtains synchronization with its respective code pattern independent of the code symbols being concurrently transmitted by devices 601, 602, . . . , 603. In line (i), the signal emanating from channel 141 is depicted, complete with the desired code symbols (cross-hatched) and the code symbols from other encoder/transmitters (non-cross-hatched) which, practically, introduce interference to the synchronization process.

Line (ii) shows the code symbols assigned to an encoder/transmitter-decoder receiver pair for which synchronization is desired. Line (iii) shows the Q=1 group, that is, the composite code pattern formed by 3 shifts of the code symbols for cells 1, 2, and 3. Line (iii) depicts the Q=2 group. (The remaining groups are not shown because the principles meant to be demonstrated can be illustrated by FIG. 10). The overlap of line (ii) with line (i) is OVERLAP=4, which is greater than the threshold of 2.0; note that the contributions to OVERLAP=4 do not result from the user's desired code symbols, but rather from other encoder/transmitters. Also, for line (iii), OVERLAP=3, which is greater than the threshold. Thus, both the patterns of lines (ii) and (iii) are candidates for further exploration by the second stage processing. In the second stage processing, if the code symbols and the two shifted versions of the code symbols giving rise to the composite code pattern of line (ii) are examined, the overlaps are OVERLAP=1, OVERLAP=2, and OVERLAP=1; none is above the threshold of 2.0.

On the other hand, if the code symbols and the two shifted versions of the code symbols giving rise to the composite code pattern of line (iii) are examined in the second stage processing, the overlaps are OVERLAP=0 (line (iv)), OVERLAP=3 (line (v)), and OVERLAP=0 (line (vi)); only the basic code pattern shifted by 4 chip intervals exceeds the threshold. Accordingly, the proper chip delay information has now been determined.

It is noted by this example that there can be a false positive in terms of coarse synchronization, which is engendered by the code symbols from other sources. Whereas normally the cross-correlation of code words is 1 on a normalized basis, because coarse synchronization utilizes composite code words to derive the composite pattern, the cross-correlation of the composite pattern is not limited to 1.

2.4 Third Illustrative Example

Figure 11A:
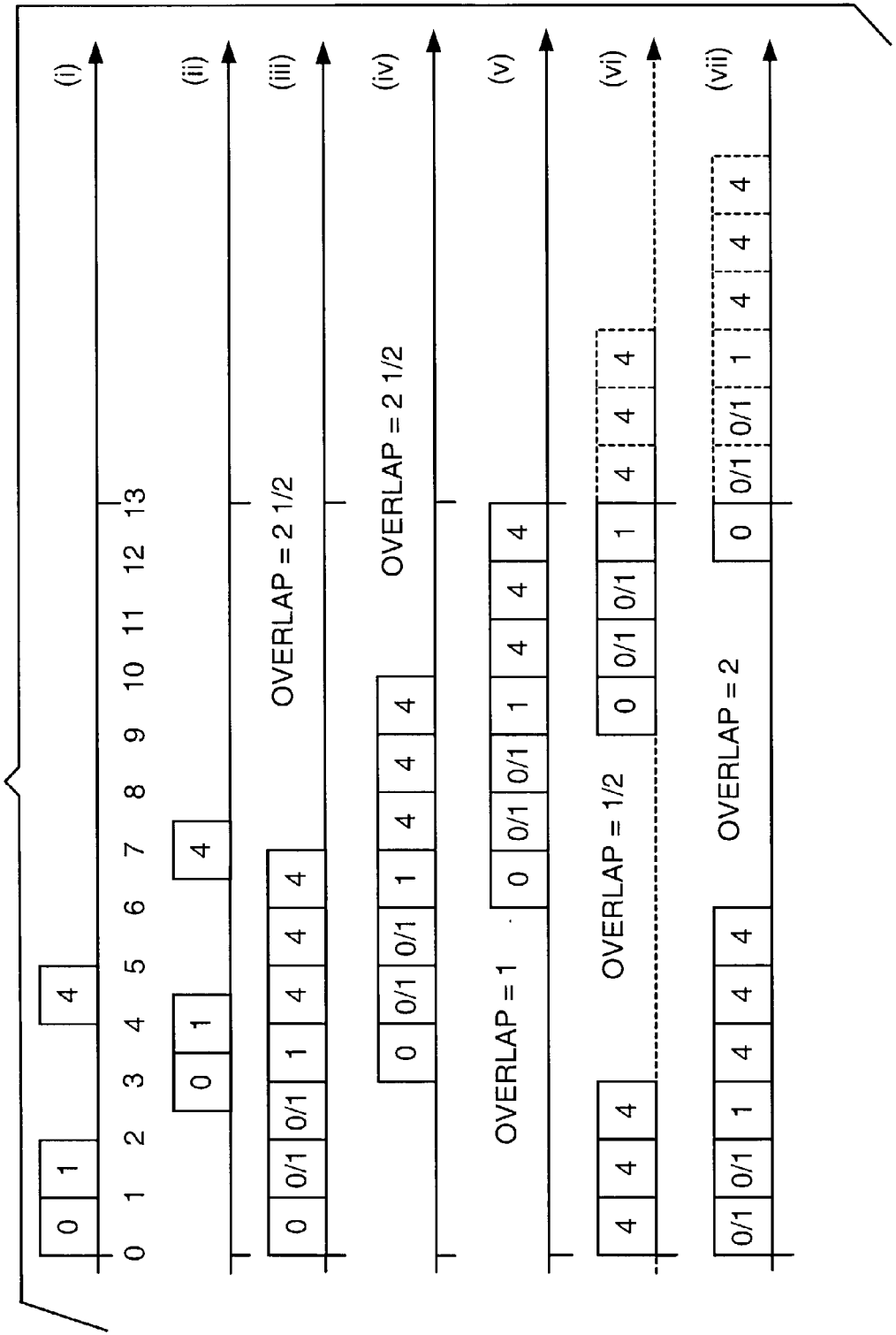
FIGS. 11A and B are pictorial representations of a technique to account for a one half-chip misalignment between the received code and the locally generated code.

Another situation to address is the case wherein the received signal is misaligned at the chip level with the locally generated code word, that is, the desired user's OOC. In a depiction analogous to the pictorial representation of FIG. 7B, FIG. 11A shows on line (ii) that the received signal is delayed 2.5 chip intervals (as contrasted to the 2 chip intervals of FIG. 7B). This depiction of FIG. 11A is a worst-case situation, that is, a ½ chip interval misalignment leads to potentially ambiguous synchronization decisions. To demonstrate this point, note that the OVERLAP=2½ for both the shifted versions shown on lines (iii) and (iv) of FIG. 11A, and both are above the 2.0 threshold.

To mitigate this potential ambiguity, two substantially different approaches can be used. One approach is to assume that the system is chip-synchronous, i.e., all the chips start at the same instant of time and aligned to each other so that, in fact, misalignment is precluded. In a practical system, there typically is a clock that synchronizes all the chip times, and all receivers and transmitters know this clock so this affords one possible solution.

However, it is possible to devise an OOC-CDMA system and methodology wherein the embodied technique can be completely asynchronous, i.e., each user can start transmitting at any instant of time. With this assumption, it is instructive to consider the worst possible case in the system. As already alluded to, the worst case occurs when there is one half-chip misalignment between the received code and locally generated code. Thus, as illustrated in FIG. 11A, no OVERLAP is equal to 3.0 as in the case of FIG. 7B, but rather the maximum OVERLAP=2.5, and such overlap occurs in two cases shown on lines (iii) and (iv), resulting in an ambiguity. A rudimentary but straightforward technique to account for the reduced maximum OVERLAP is to choose a smaller threshold. Instead of using, say K, as the threshold, $\alpha K$, $\alpha<1$, can be selected to be the threshold. This assures that even in the worst case, the correct position is not missed. But selecting a smaller threshold, while a very simple method, is not very efficient. Since K is generally a small value in typical OOC-CDMA systems, there will be a large degradation in the system's performance with the selection of a smaller threshold since it is more likely to produce false alarms or ambiguities.

In a more complex but preferred method, it is presumed that the groups are selected such that the shifts in one group are adjacent (just like all the figures and examples to this point in the description). Note that generally there is no restriction on selection of the groups and therefore any L shifts may be selected for a group, but here it is advantageous to assume that the shifts selected in a group are adjacent. In this way, the pattern generated by combining these shifts will have a pattern similar to the OOC pattern, with each pulse, in effect, expanded or augmented.

Figure 11B:
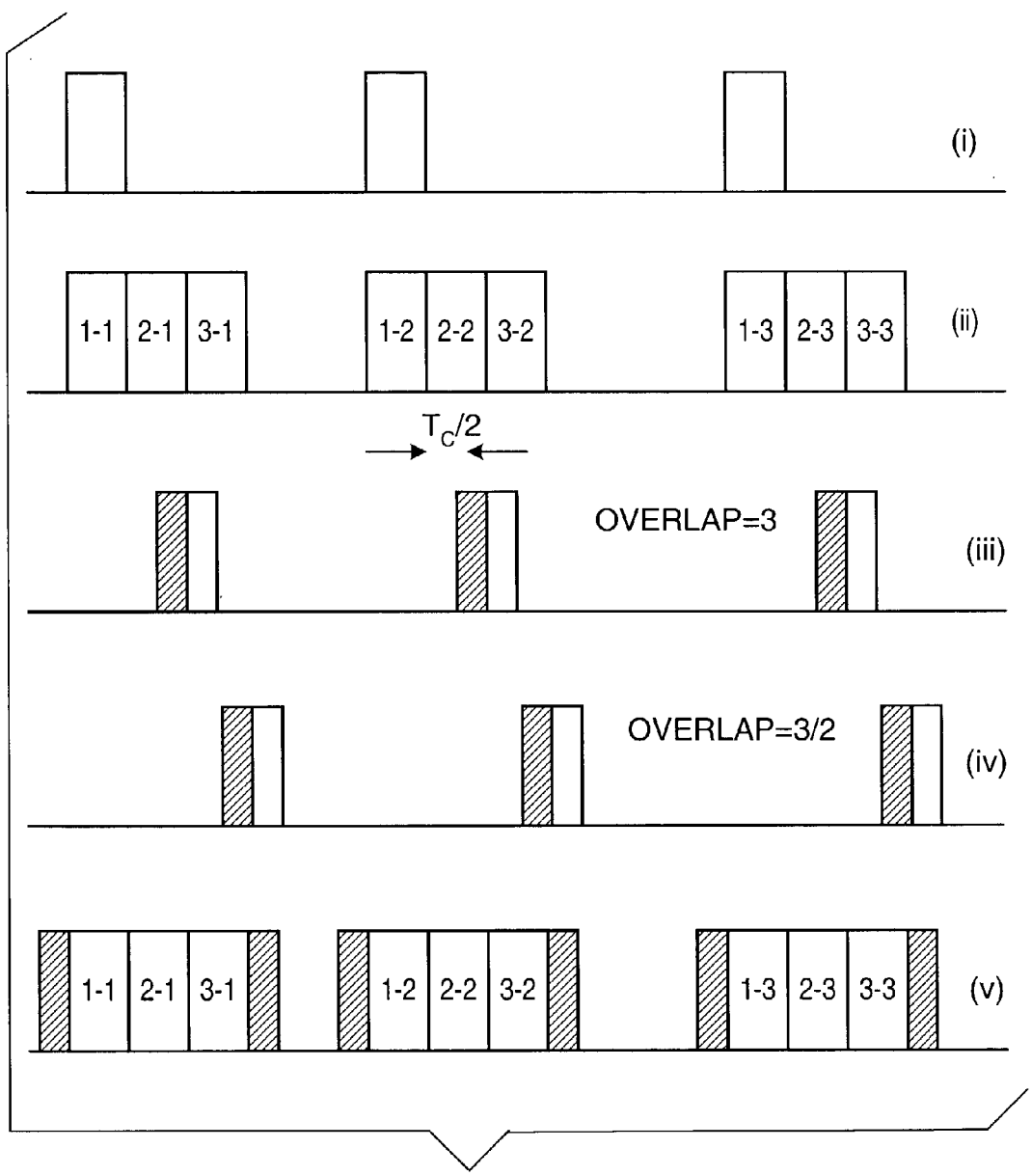

To visualize the method, consider the pictorial view in FIG. 11B. Line (i) depicts a representative OOC pattern. When adjacent shifts are used, the composite pattern is shown in line (ii), that is, line (ii) may be viewed as an expansion of the OOC pattern. Line (iii) depicts the received code, which is delayed by 1½ chips. Since there is a mismatch of one-half chip time between the pulses in second shift (pulses 2-1,2-2 and 2-3) and the received pulses, only half of the received pulses will combine with the second shift. However, an OVERLAP=3 still obtains since the other half of the received pulses will be collected by the third shift (pulses 3-1,3-2, and 3-3). Thus, there is no problem with such this particular delay.

On the other hand, consider what occurs when the received pattern is as shown on line (iv), i.e., the received pattern is a shifted ½ chip beyond the last shift in the group. Now OVERLAP=1.5 results, which is below the threshold of 2.0.

To rectify this situation, the modified pattern shown in line (v) is used in place of the composite code pattern of line (ii). To generate this modified pattern, a pulse of width $T_c/2$ is added to the start and end of each expanded pulse (the cross-hatched pulses in line (v)). Thus, instead of using the pattern of line (ii), this new pattern of line (v) is used in the first stage of the algorithm. With this so-called modified pattern, even if there is a one-half chip time difference (which is the worst possible case) between the received pattern and one of the shifts in the pattern, the overlap will be complete. Thus, the same threshold holds whether or not the received signal is chip aligned or chip misaligned.

In the second stage of the algorithm, when each shift is considered separately, a reduced threshold can be used, or the individual code pulses making up the user's OOC can be expanded in the same manner as in the first stage. Practically, either suffices since it has been empirically determined that the performance of the synchronization system is not very sensitive to the value of threshold in the second stage.

Figure 12:
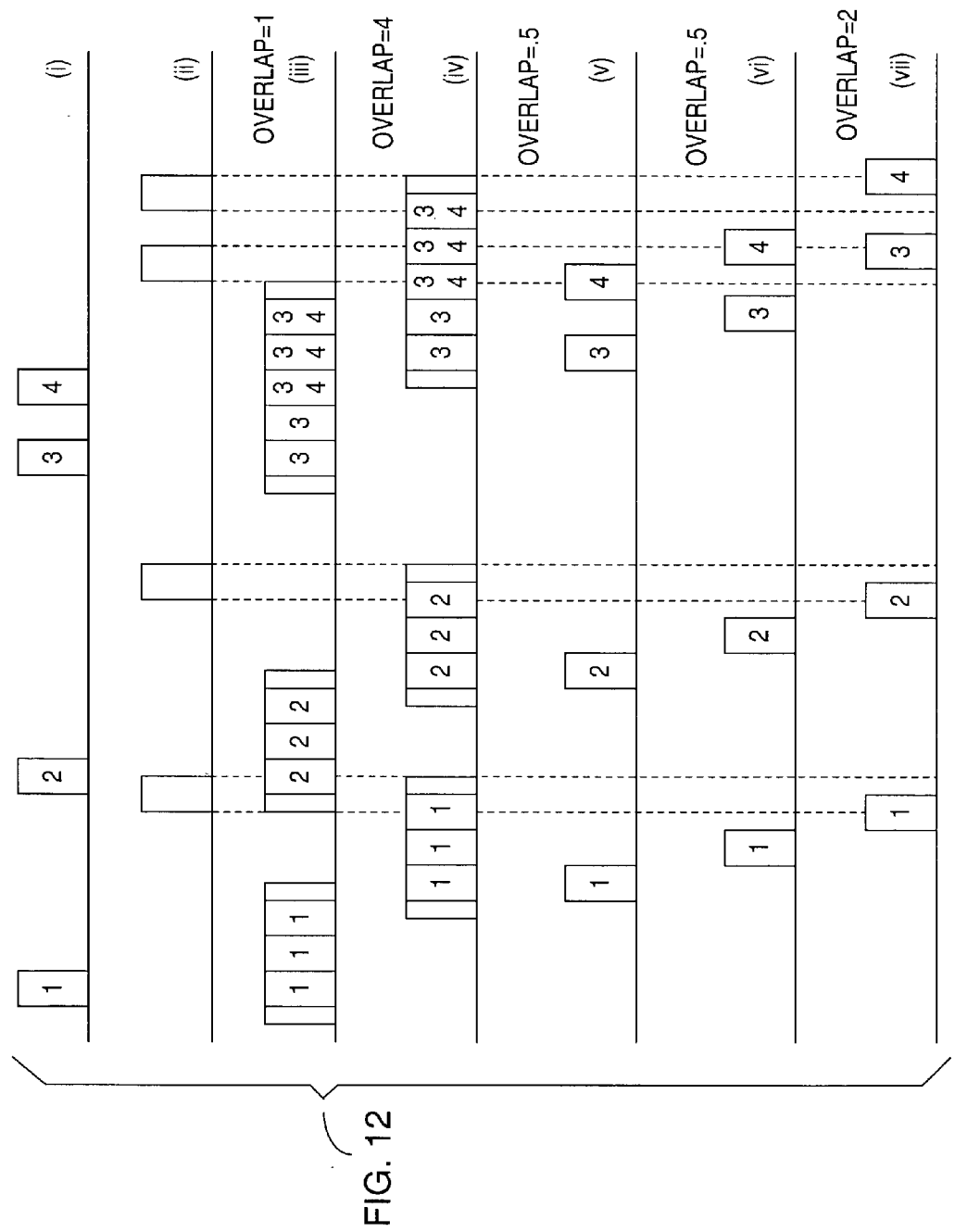
FIG. 12 is a pictorial representation for both the coarse synchronization and the fine synchronization processing wherein there is a one half-chip misalignment between the received code and the locally generated code.

To further amplify on the use of the modified cone pattern method, consider the pictorial of FIG. 12. In line (i) a typical OOC code is shown. Line (ii) shows the received code pattern (which has a delay of 4.5 chips). Two modified patterns are shown in lines (iii) and (iv), respectively. The pattern of line (iii) represents a group that will be rejected and the pattern of line (iv) shows a group that will be accepted. Then lines (v), (vi), and (vii) depict the patterns used in the second stage. It is readily deduced that the threshold can be 4.0 in the first stage, while the threshold must be 2.0 in the second stage since the second stage does not use expanded pulses.

2.5 Illustrative System

Figure 13:
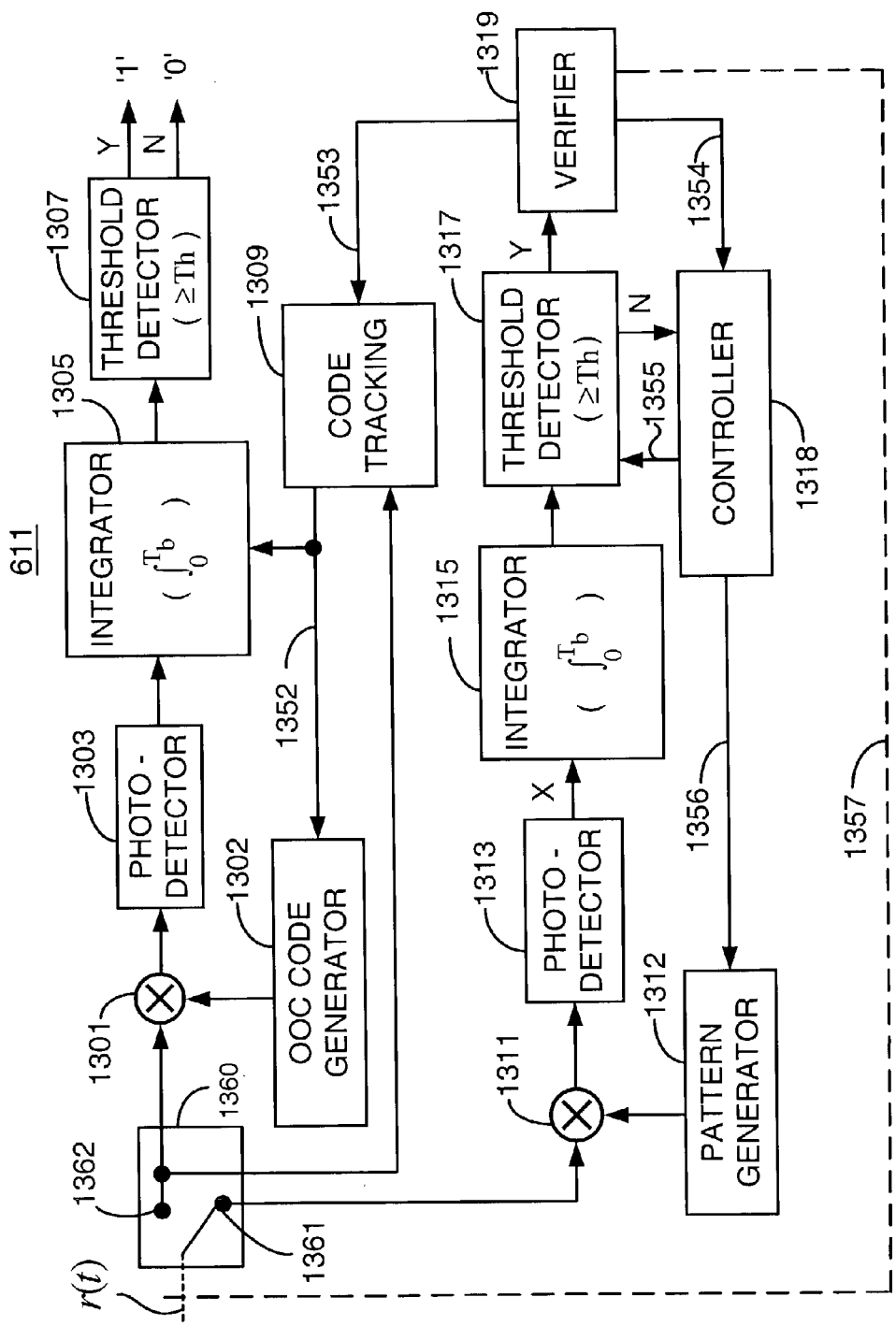
FIG. 13 is depicts a block diagram representation for the decoder/receiver shown in FIG. 6.

To exemplify the code acquisition technique embodied in a system, reference is made to system 1300 of FIG. 13, which shows decoder/receiver 611 in detail; elements 612 and 613 are similarly arranged. Element 611 is generally partitioned into a decoding section and a code acquisition section to achieve synchronization. The decoding section is shown in the upper portion of FIG. 13, and is essentially the same decoding arrangement as shown and described with respect to FIG. 5B; the decoding section is accessed once synchronization has been accomplished. The decoding section includes the following components: OOC generator 1302, multiplier 1301, photo-detector 1303, integrator 1305, and threshold detector 1307. The input r(t) to the decoding section is provided via a contact position 1362 of switch 1360. Synchronization information from the code acquisition section is provided via lead 1352 from code tracking device 1309 to code generator 1302.

The code acquisition section is composed of: (a) the cascade of multiplier 1311, photo-detector 1313, integrator 1315, threshold detector 1317, and verifier 1319; (b) pattern generator 1312 coupled to multiplier 1311; (c) controller 1318 coupled to generator 1312 and threshold detector 1317 and responsive to verifier 1319; and (d) code tracking device 1353 responsive to verifier 1319. A second input to multiplier 1311 is provided by contact position 1361 of switch 1360. Switch 1360 is operated between its two contact positions via a switch control signal appearing on lead 1357 from verifier 1319.

To check each cell, a simple correlation test is adopted. It is assumed initially that switch 1360 is in position 1361 and that, for example, the encoder/transmitter 601 continuously sends bit one so the user's code pattern is transmitted. The received signal r(t) is correlated with a shifted version of the desired user's code produced by pattern generator 1312 which corresponds to the cell being examined for a specified time duration. If the output of the correlation operation exceeds the predefined threshold Th of detector 1317, the cell is accepted as the correct cell; otherwise the cell is rejected. The time required to check the state of correctness or incorrectness of each cell is called "dwell time". Due to the auto-correlation properties of OOCs, the dwell time of the system should be at least one bit time, or multiples of the bit duration; for most efficient operation, the value chosen is one bit duration.

Multi-access interference and other kind of noise sources may cause error in deciding about the correctness of a shift position in second stage or a group in the first stage. This case is called "false alarm", i.e. we have false alarm in the first stage when none of the L shifts are correct but the decision variable exceeds the threshold and false alarm occurs in the second stage when the shift is not correct but the output of threshold detector 1317 indicates differently. It is the task of verification mode, via verifier 1319, to detect false alarms in the second stage. The verification mode is initiated when, in the second stage, it is claimed that the correct shift is found. It is that the verification mode requires a certain amount of time which is called "penalty time" to detect the false alarm.

Another error that may occur in the search process is missing the correct shift position. Like false alarm, this error may arise in both the first and the second stages. However, since the interference in the OOC-CDMA system can only increase the output, with the proper selection of the thresholds the probability of missing the correct shift will be very small, or equivalently the probability of detecting the correct shift will be very near one.

One simple method for partitioning the F different shift positions into L-element groups is to place L adjacent shifts in a group; i.e. $\{0, T_c, 2T_c, \ldots, (L-1)T_c\}$ shift positions are selected for the first group and $\{LT_c, (L+1)T_c, \ldots, (2L-1)T_c\}$ for the seco and other groups would follow in the same way, as illustrated by the above examples.

Consider that the code generator uses "cyclic shift" instead of simple "delayed shift", and further consider an OOC code expressed as follows:

$$c(t) = \sum_{i=0}^{F-1} a_i P_{T_c}(t - iT_c) \quad (6)$$

where $(a_0, a_1, \ldots, a_{F-1})$ is the code pattern. The mth cyclic shift of this code is defined as:

$$u_{Cyclic\ Shift}(t) = \sum_{i=0}^{F-1} a_{(m+i)\bmod F} P_{T_c}(t - iT_c) \quad (7)$$

Define the mth delayed shift as:

$$u_{Delayed\ Shift}(t) = c(t - mT_c) = \sum_{i=0}^{F-1} a_i P_{T_c}(t - (i+m)T_c) \quad (8)$$

By using the cyclic shift, it is ensured that the locally generated pattern will at most have a total length of F chips and dwell time can be selected to be one bit duration.

Although we consider a simple active correlator structure, i.e., the code acquisition section of FIG. 13, for examining the shift positions, other receiver structures like a matched filter with or without hardlimiter(s) can be also used. It is only required that the structure have the ability to compute the decision variable, that is, the output of integrator 1315, when the first stage examines L shifts simultaneously. For example, if the matched filter structure is used, the decision variable in the first stage can be computed by integrating the output of matched filter in L different chip positions corresponding to the L shifts being examined and then adding the results for these chip positions.

In the multiple-shift algorithm the choice of the parameter L could be of outmost importance, since the arbitrarily increase of this parameter could have two different effects on the performance of the synchronization system. As L increases the number of shifts examined simultaneously increases and therefore the search space will be covered in fewer tries. In other words the parameter Q that represents the number of groups will decrease. On the other hand with the increase of L, the number of dwell times required to find the correct shift among the L shifts in the second stage will increase. Another effect of increasing L is that the probability of false alarm of the first stage will increase since with the use of a larger value for parameter L, introducing more interference in the checking process. It is therefore expected that an optimum value for L exists for which the performance of the synchronization system is optimum, or equivalently the synchronization time is minimum.

2.6 Flow Diagrams

Figure 14A:
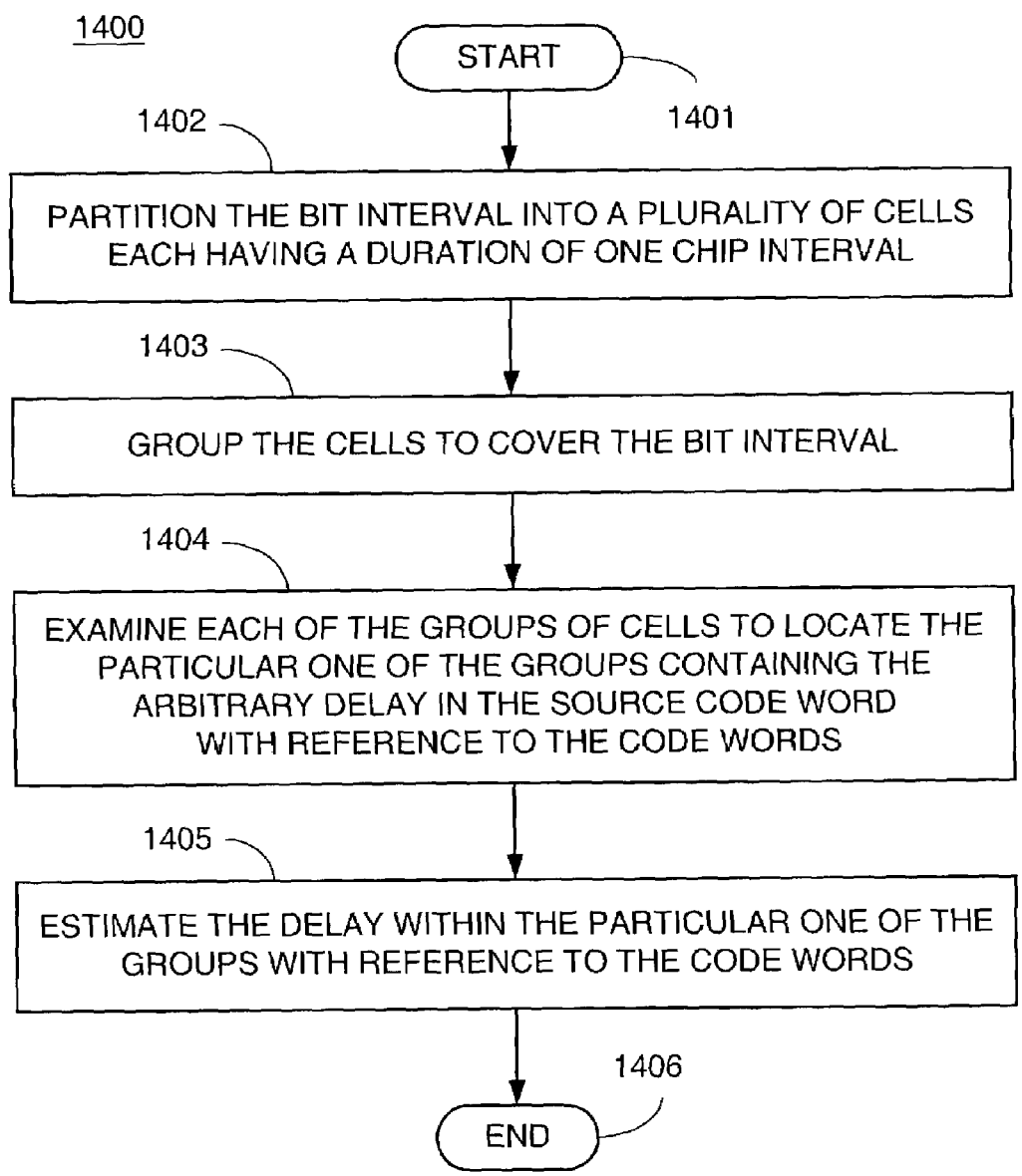
FIG. 14A is a flow diagram representative of the broad methodology in accordance with the present invention.
Figure 14B:
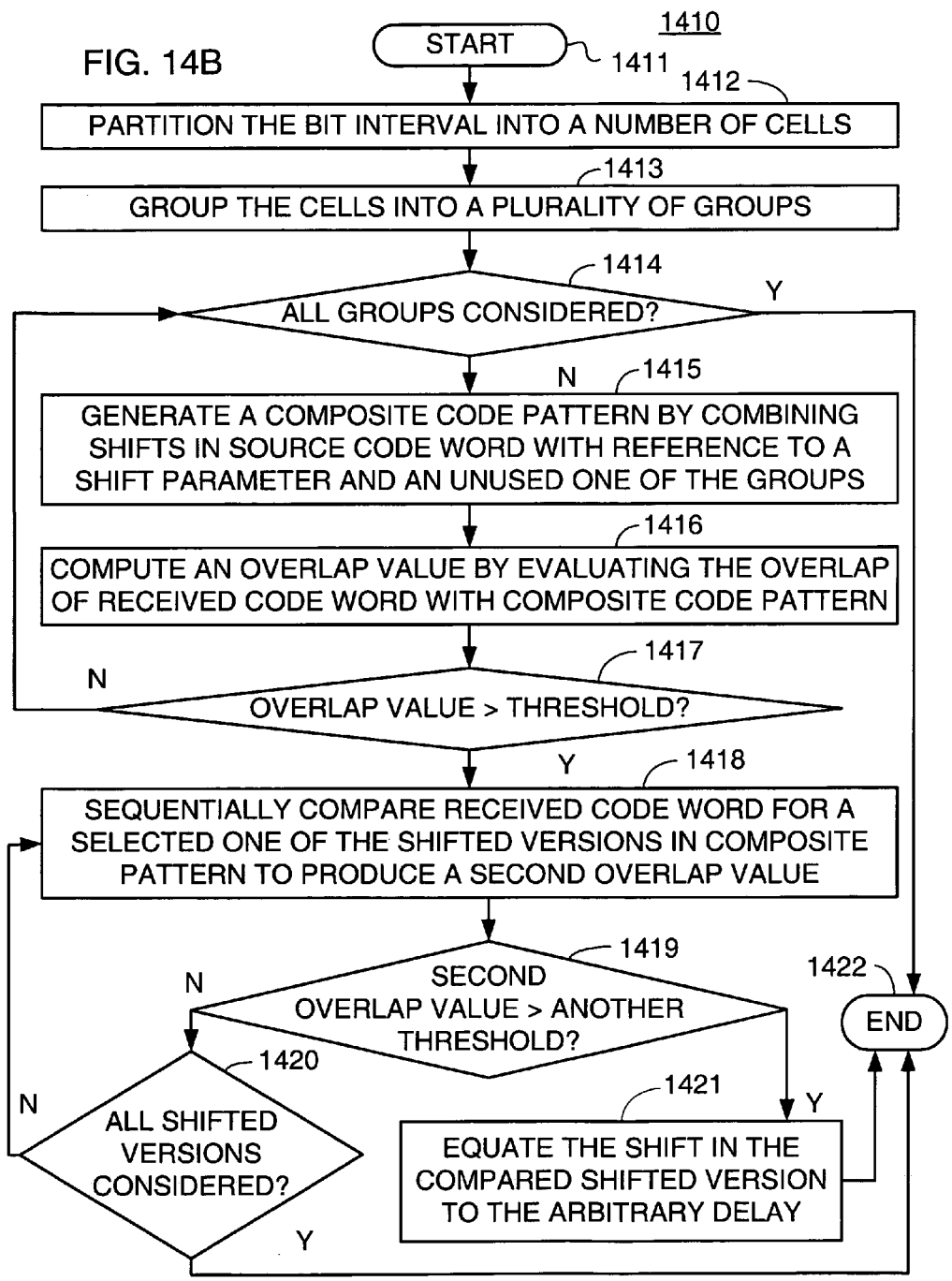
FIG. 14B is a flow diagram of a preferred methodology in accordance with the present invention.

With reference to FIG. 14A, there is shown flow diagram 1400 of a broad aspect of the present invention. In particular, diagram 1400 depicts:

Processing block 1401: start of the technique which is a method for determining an arbitrary delay in a source code word propagated over a channel that introduces the arbitrary delay in the source code word to produce a received code word, the code words encompassing a given bit interval Processing block 1402: partitions the bit interval into a plurality of cells each having a duration of one chip interval Processing block 1403: groups the cells to cover the bit interval Processing block 1404: examines each of the groups of cells to locate the particular one of the groups containing the arbitrary delay in the source code word with reference to both the source code word and the received code word Processing block 1405: estimates the delay within the particular one of the groups with reference to the code words Processing block 1406: end of processing With reference to FIG. 14B there is shown block diagram 1410 which depicts a preferred methodology in accordance with the present invention. In particular, diagram 1400 depicts:

Processing block 1411: start of the technique which is a method for determining an arbitrary delay in a source code word propagated over a channel that introduces the arbitrary delay in the source code word to produce a received code word, the code words encompassing a given bit interval Processing block 1412: partitions the bit interval into a plurality of cells each having a duration of one chip interval Processing block 1413: groups the cells to cover the bit interval Processing block 1414: a decision point to determine all groups have been processed—if yes, technique ends in processing block 1422; if not, the processing of block 1415 is invoked Processing block 1415: generate a composite code pattern by combining shifts in the source code word with reference to a shift parameter and an unused one of the groups Processing block 1416: compute the overlap value by evaluating the overlap of the received code word with the composite code pattern Processing block 1417: a decision point to determine if the overlap value is greater than a given threshold. If not, then the processing returns to processing block 1414; if yes, then the processing continues with processing block 1418

Processing block 1418: sequentially compares the received code word for a selected one of the shifted versions of the source code used to form the composite code pattern to produce a second overlap value Processing block 1419: a decision point to determine if the second overlap value is greater than a predetermined threshold. If not, the processing block 1420 is invoked; if yes, the processing block 1421 is invoked Processing block 1420: a decision point to determine if all shifted versions of the source code word used to form the composite code pattern have been considered. If not, the processing continues with processing block 1418; if yes, the processing ends.

Processing block 1421: equates the shift in the compared shifted version to the arbitrary delay.

Processing block 1422: ends the processing.

Although the embodiments of the present invention have been shown and described in detail herein, those skilled in the art can readily devise many other varied embodiments that still incorporate these teachings. Thus, the previous description merely illustrates the principles of the invention. It will thus be appreciated that those with ordinary skill in the art will be able to devise various arrangements, which although not explicitly described or shown herein, embody principles of the invention and are included within its spirit and scope. Furthermore, all examples and conditional language recited herein are principally intended expressly to be only for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, that is, any elements developed that perform the function, regardless of structure.

In addition, it will be appreciated by those with ordinary skill in the art that the block diagrams herein represent conceptual views of illustrative circuitry embodying the principles of the invention.

What is claimed is:

1. A method for determining an arbitrary delay in a source code word propagated over a channel that introduces the arbitrary delay in the source code word to produce a received code word, the source code word and the received code word encompassing a given time interval, the method comprising
   partitioning the time interval into cells and grouping a plurality of cells into groups of cells,
   examining each of the groups to locate a particular one of the groups containing the arbitrary delay with reference to the source code word and the received code word,
   estimating the arbitrary delay within the particular one of the groups with reference to the source code word and the received code word, wherein the examining includes:
   generating a composite code pattern with reference to the source code word to examine each of the groups,
   randomly selecting one of the groups, and
   computing an overlap value between the received code word and the composite code pattern for the randomly selected one of the groups.

2. The method as recited in claim 1 wherein the particular one of the groups is determined whenever the overlap value exceeds a given threshold.

3. The method as recited in claim 2 wherein
   the generating further includes generating the composite code pattern from a plurality of shifted versions of the source code word, and
   the estimating includes
   (a) computing another overlap value for a selected one of the shifted versions, and
   (b) whenever said another overlap value exceeds a predetermined threshold, identifying the arbitrary delay with reference to said selected one of the shifted versions and the particular one of the groups; otherwise, returning to (a) until all shifted versions are processed.

4. The method as recited in claim 2 wherein, if the overlap value is less than the given threshold, randomly selecting another one of the groups to re-compute the overlap value and continuing the randomly selecting until the re-computed overlap value exceeds the given threshold.

5. The method as recited in claim 1 wherein the generating includes augmenting the composite code pattern to produce a modified composite code pattern.

6. The method as recited in claim 5 wherein the examining includes
   randomly selecting one of the groups, and
   computing an overlap value between the received code word and the modified composite code pattern for the randomly selected one of the groups.

7. The method as recited in claim 6 wherein the particular one of the groups is determined whenever the overlap value exceeds a given threshold.

8. The method as recited in claim 7 wherein
   the generating further includes generating the modified composite code pattern from a plurality of shifted versions an expanded source code word, and
   the estimating includes
   (a) computing another overlap value for a selected one of the shifted versions, and
   (b) whenever said another overlap value exceeds a predetermined threshold, identifying the arbitrary delay with reference to said selected one of the shifted versions of the expanded source code word and the particular one of the groups; otherwise, returning to (a) until all shifted versions are processed.

9. The method as recited in claim 7 wherein, if the overlap value is less than the given threshold, randomly selecting another one of the groups to re-compute the overlap value and continuing the randomly selecting until the re-computed overlap value exceeds the given threshold.

10. The method as recited in claim 7 wherein
    the generating further includes generating the modified composite code pattern from a plurality of shifted versions of an expanded source code word, and
    the estimating includes
    (a) computing another overlap value for a selected one of the shifted versions, and
    (b) whenever said another overlap value exceeds a predetermined threshold, identifying the arbitrary delay with reference to said selected one of the shifted versions of the source code word only and the particular one of the groups; otherwise, returning to (a) until all shifted versions are processed.

11. The method as recited in claim 10 wherein, if the overlap value is less than the given threshold, randomly selecting another one of the groups to re-compute the overlap value and continuing the randomly selecting until the re-computed overlap value exceeds the given threshold.

12. A method for determining an arbitrary delay in a source code word propagated over a channel that introduces the arbitrary delay in the source code word to produce a received code word, the source code word and the received code word encompassing a given time interval, the method comprising
    (a) partitioning the bit interval into a number of cells,
    (b) grouping the cells into a plurality of groups,
    (c) generating a composite code pattern by combining shifts in the source code word with reference to a shift parameter and a previously unused one of the groups,
    (d) computing an overlap value by evaluating the overlap of the received code word with the composite code pattern, (e) if the overlap value exceeds a given threshold, continuing with (f); otherwise returning to (c), (f) sequentially comparing the received code word for a selected one of the shifted versions of the source code word used to form the composite code pattern to produce a second overlap value, and (g) whenever the second overlap value exceeds a predetermined threshold, equating the shift in the compared shifted version of the source code word to the arbitrary delay; otherwise, either returning to (f) until all shifted versions are processed or to (c) until all groups are processed.

13. The method as recited in claim 12 wherein the generating includes augmenting the composite code pattern to produce a modified composite code pattern.

14. A method for detecting an arbitrary delay in a received code word corresponding to a source code word propagated from a transmitter to a receiver over a channel that introduces the arbitrary delay in the source code word, both the source code word and the received code word covering a bit interval subdivided into a plurality of chip intervals, the method comprising (a) partitioning the bit interval into F cells, each of the cells having a duration substantially equal to the chip interval, (b) determining a group number Q from the relation $$Q = \left\lceil \frac{F}{L} \right\rceil,$$

where L is a shift parameter, 1<L<F, (c) generating a composite code pattern by combining L shifts in the source code word with reference to a randomly selected number from the set $\{1, 2, \ldots, Q\}$, excluding previously-selected members of the set, (d) computing an overlap value by evaluating the overlap of the received code word with the composite code pattern, (e) if the overlap value exceeds a given threshold, continuing with (f); otherwise returning to (c), (f) comparing the received code word with a previously unprocessed one of the L shifted versions of the source code word used to form the composite code pattern to produce a second overlap value, and (g) whenever the second overlap value exceeds a predetermined threshold, equating the shift in the compared shifted version of the source code word to the arbitrary delay; otherwise, if shifts remain to be processed, returning to (f) if not, returning to (c).

15. The method as recited in claim 14 wherein a stream of information-bearing received code words is propagated from the transmitter upon determination of the arbitrary delay and the method further comprises synchronizing the stream in the receiver with reference to the arbitrary delay.

16. The method as recited in claim 14 wherein the generating includes augmenting the composite code pattern to produce a modified composite code pattern.

17. The method as recited in claim 16 wherein a stream of information-bearing received code words is propagated from the transmitter upon determination of the arbitrary delay and the method further comprises synchronizing the stream in the receiver with reference to the arbitrary delay.

18. The method as recited in claim 14 wherein the comparing includes augmenting the source code word when forming the L shifted versions of the source code word.

19. A receiver for determining an arbitrary delay in a source code word propagated over a channel that introduces the arbitrary delay in the source code word to produce a received code word, the source code word and the received code word encompassing a given time interval, the method comprising means for partitioning the time interval into cells and for grouping a plurality of cells into groups of cells, means for examining each of the groups to locate a particular one of the groups containing the arbitrary delay with reference to the source code word and the received code word, means for estimating the arbitrary delay within the particular one of the groups with reference to the source code word and the received code word, wherein the means for examining includes:

means for generating a composite code pattern with reference to the source code word to examine each of the groups, means for randomly selecting one of the groups, and means for computing an overlap value between the received code word and the composite code pattern for the randomly selected one of the groups.

* * * * *